(12) United States Patent
Tunnell et al.

(10) Patent No.: US 10,565,569 B2
(45) Date of Patent: Feb. 18, 2020

(54) METHODS AND SYSTEMS RELATED TO MULTI-FACTOR, MULTIDIMENSIONAL, MATHEMATICAL, HIDDEN AND MOTION SECURITY PINS

(71) Applicant: NXT-ID, Inc., Shelton, CT (US)

(72) Inventors: David Tunnell, Palm Bay, FL (US);
Andrew Tunnell, Palm Bay, FL (US);
Justin Mitchell, St. Cloud, FL (US)

(73) Assignee: Nxt-ID, Inc., Sebastian, FL (US)

( * ) Notice: Subject to any disclaimer, the term of this patent is extended or adjusted under 35 U.S.C. 154(b) by 388 days.

(21) Appl. No.: 15/224,998

(22) Filed: Aug. 1, 2016

(65) Prior Publication Data

US 2017/0032113 A1    Feb. 2, 2017

Related U.S. Application Data

(60) Provisional application No. 62/198,817, filed on Jul. 30, 2015.

(51) Int. Cl.
*G06F 21/00* (2013.01)
*G06Q 20/06* (2012.01)
(Continued)

(52) U.S. Cl.
CPC ......... *G06Q 20/065* (2013.01); *G06F 21/316* (2013.01); *G06F 21/36* (2013.01);
(Continued)

(58) Field of Classification Search
None
See application file for complete search history.

(56) References Cited

U.S. PATENT DOCUMENTS 6,270,011 B1    8/2001 Gottfried
7,086,085 B1    8/2006 Brown
(Continued)

FOREIGN PATENT DOCUMENTS

CA    2765922    12/2010
CA    2817431    12/2013
(Continued)

OTHER PUBLICATIONS

Yampolskiy, R., Govindaraju, V., "Direct and Indirect Human Computer Interaction Based Biometrics", Journal of Computers, vol. 2, No. 10, Dec. 2007, p. 76-88 (Year: 2007).*

*Primary Examiner* — Alexander Lagor
(74) *Attorney, Agent, or Firm* — Beusse, Wolter, Sanks & Maire PLLC; John L. DeAngelis

(57) ABSTRACT

Systems and methods to authenticate a user using. Techniques for authenticating a user focus less on what the user enters, and more on how the user enters it. Different user specific factors are recognized, such as the speed with which a pattern, drawing or the like is produced, pressure applied, or the area of contact. In some embodiments, the user is able to produce the PIN using several different techniques. Some methods of the present invention utilize actions that the user is familiar with executing, or naturally performs on a regular basis. Furthermore, some methods of the present invention consist of embodiments wherein mathematical operations or device motions are used during the PIN authentication process.

32 Claims, 16 Drawing Sheets

Drag first element to second

Drag to make next element

Drag to make next element

Approved PIN

(51) Int. Cl.
    *G06F 21/31*     (2013.01)
    *G06F 21/36*     (2013.01)
    *H04L 9/08*     (2006.01)
    *H04L 29/06*     (2006.01)
    *G06Q 20/38*     (2012.01)
    *G06Q 30/02*     (2012.01)

(52) U.S. Cl.
    CPC ....... *G06Q 20/382* (2013.01); *G06Q 30/0207* (2013.01); *H04L 9/0866* (2013.01); *H04L 63/083* (2013.01); *H04L 63/0861* (2013.01); *H04L 2463/082* (2013.01)

(56) References Cited

U.S. PATENT DOCUMENTS

| | | | |
|---|---|---|---|
| 7,357,310 B2 | 4/2008 | Calabrese |
| 7,360,689 B2 | 4/2008 | Beenau |
| 7,500,616 B2 | 3/2009 | Beenau |
| 7,506,818 B2 | 3/2009 | Beenau |
| 7,814,332 B2 | 10/2010 | Beenau |
| 7,818,264 B2 | 10/2010 | Hammad |
| 7,886,157 B2 | 2/2011 | Beenau |
| 7,992,007 B2 | 8/2011 | Lazzaro |
| 8,384,514 B2 | 2/2013 | Novack |
| 8,627,096 B2 | 1/2014 | Azar |
| 8,752,146 B1 | 6/2014 | Van Dijk |
| 8,819,428 B2 | 8/2014 | Baig |
| 8,819,812 B1 | 8/2014 | Weber |
| 8,825,548 B2 | 9/2014 | Khan |
| 8,831,189 B2 | 9/2014 | Maximo |
| 8,843,757 B2 | 9/2014 | Varadarajan |
| 8,850,218 B2 | 9/2014 | Hird |
| 8,867,713 B2 | 10/2014 | New |
| 8,868,921 B2 | 10/2014 | Cramer |
| 8,893,244 B2 | 11/2014 | Counterman |
| 8,925,801 B2 | 1/2015 | Smith |
| 8,943,322 B2 | 1/2015 | Gupta |
| 8,970,348 B1 | 3/2015 | Evans |
| 9,015,490 B2 | 4/2015 | Thom |
| 9,135,622 B2 | 9/2015 | Puthenveetil |
| 9,147,063 B1 | 9/2015 | Florissi |
| 9,183,552 B2 | 11/2015 | Kavinskangas |
| 9,207,771 B2 | 12/2015 | Antoiac |
| 9,223,955 B2 | 12/2015 | Lymberopoulos |
| 9,258,296 B2 | 2/2016 | Juthani |
| 9,274,607 B2 | 3/2016 | DeLean |
| 9,292,731 B2 | 5/2016 | Carrizo et al. |
| 9,331,852 B2 | 5/2016 | Gupta |
| 2002/0184100 A1 | 12/2002 | Bhatnager |
| 2007/0236330 A1* | 10/2007 | Cho ..................... G06F 21/305 340/5.54 |
| 2011/0032074 A1 | 2/2011 | Novack |
| 2011/0072510 A1* | 3/2011 | Cheswick ............ G06F 3/0481 726/18 |
| 2012/0167199 A1 | 6/2012 | Riddiford |
| 2012/0254963 A1 | 10/2012 | Sancheti |
| 2012/0323788 A1 | 12/2012 | Keresman, III |
| 2013/0061057 A1 | 3/2013 | Sinha |
| 2013/0269013 A1 | 10/2013 | Parry |
| 2013/0322705 A1 | 12/2013 | Wang |
| 2014/0096177 A1 | 4/2014 | Smith |
| 2014/0302818 A1 | 10/2014 | Fyke |
| 2015/0347734 A1 | 3/2015 | Beigi |
| 2015/0134962 A1* | 5/2015 | Mahajan ............. H04L 63/0428 713/171 |
| 2015/0213246 A1* | 7/2015 | Turgeman ............... G06F 21/32 726/23 |
| 2016/0239649 A1* | 8/2016 | Zhao ..................... G06F 21/316 |

FOREIGN PATENT DOCUMENTS

| | | |
|---|---|---|
| EP | 2732594 | 5/2014 |
| EP | 2747366 | 6/2014 |
| WO | 2011004339 | 1/2011 |
| WO | 2011124275 | 10/2011 |

\* cited by examiner

Review page 1

Review page 2

Review page 3 and select page

Approved PIN

Review page 2

Approved PIN

Drag first 2 numbers

Review page 3

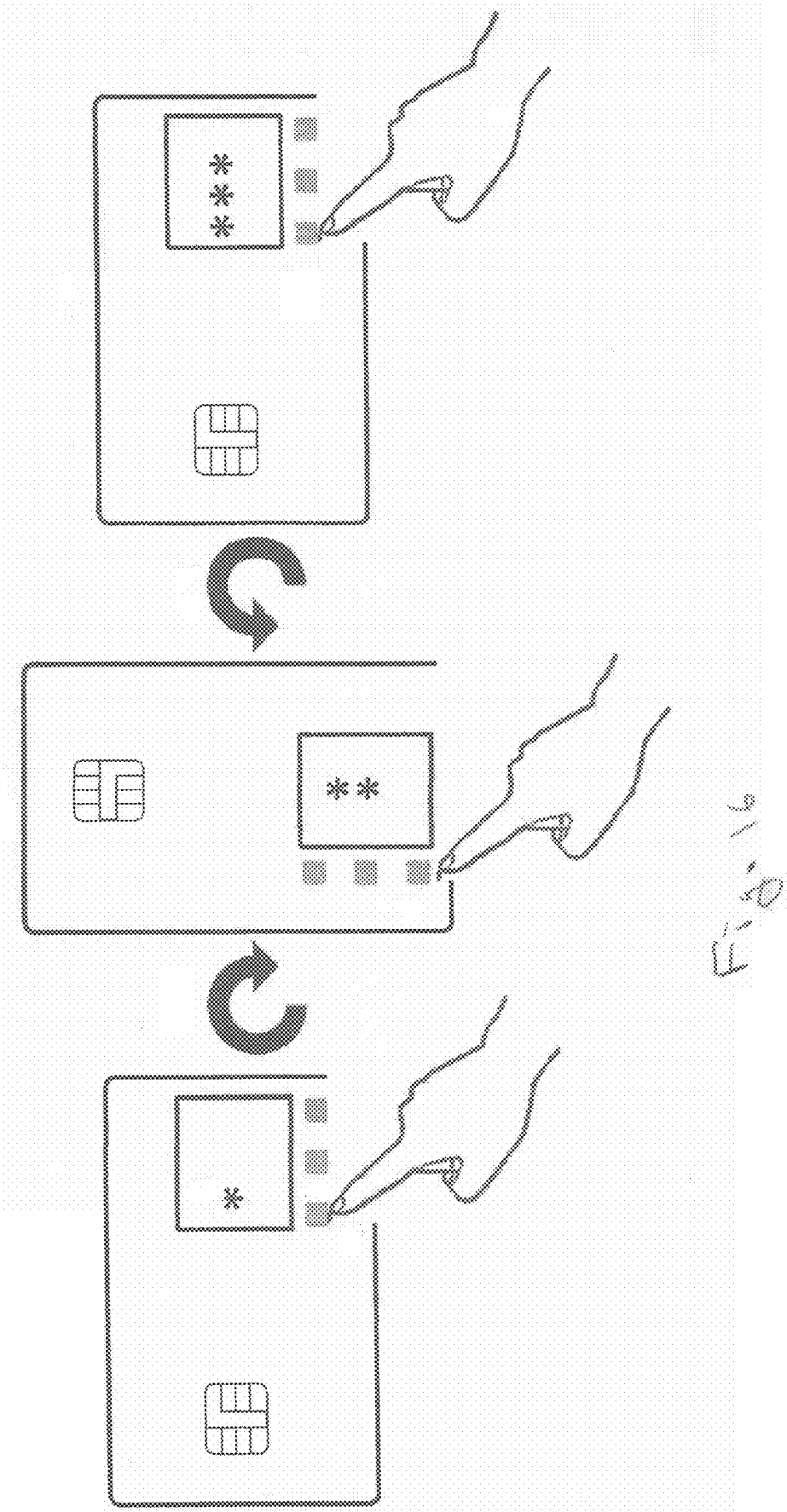

METHODS AND SYSTEMS RELATED TO MULTI-FACTOR, MULTIDIMENSIONAL, MATHEMATICAL, HIDDEN AND MOTION SECURITY PINS

CROSS REFERENCE TO RELATED APPLICATIONS

This patent application claims the benefit of U.S. provisional patent application filed Jul. 30, 2015 and assigned Application No. 62/198,817, which is incorporated herein in its entirety.

FIELD OF THE INVENTION

The present invention relates to the general field of user authentication as related to maintaining the security of websites, controlled access regions, applications, secure systems, financial accounts, etc.

BACKGROUND OF THE INVENTION

With the increase in financial fraud and innovative hacking methods, authenticating a user for the purpose of accessing information, especially financial accounts, has become challenging. In the past, basic four digits Personal Identification Numbers (PIN) codes have been used to access information. However, four-digit PIN codes are often insecure, vulnerable to hacks or theft. Although attempts have been made to offset the potential of a PIN being hacked or stolen, the problem of keeping accounts secure still persists.

Personal Identification Numbers are commonly used to authenticate a user by having the user enter "something they know". Although any number of digits may be used, arguably today the 4-digit PIN, as shown in FIG. 1, is one of the most commonly used methods to add security to access control. A typical 4-digit PIN can use one of nine characters over four digits or about 10,000 possible permutations. A chief limitation of this method for PIN authentication is that it limits authentication to a single factor, i.e., "something you know.".

To further improve security of PIN based methods, PINs are frequently added to items such as electronic cards, for example, that possess a chip inside. This method is frequently called "chip and PIN". A "chip and PIN" method adds a second factor to the PIN (something you know) by adding a chip (something you have) inside a card or device.

One example of prior art relating to a PIN concept is described in WO 2011004339 A1. This implementation uses a second identifier to authenticate a user. Under this invention, an identification file consisting of the data from the present transaction is sent to an identifier using direct energy. The identifier then uses the direct energy to encrypt the identification file with a key and attach the PIN. Sending this encrypted package to a payment-processing center, the total package is then decrypted using a public key and the verification of the PIN.

Although this two-factor system does offer some additional protection of a user's assets, it has its limitations. Such limitations include the vulnerability of a third party intercepting the identifier file before it is encrypted. Other problems arise due to the use of only a single key to encrypt the identification file. In order to carry out a successful attack, a third party would only need the correct key and the PIN. Those experienced in the art will recognize that a non-dynamic PIN also increases the chances of a successful "brute force" attack. Hackers can also gain access through the use of a "back door" in either the payment terminal or the payment-processing center, further deteriorating the security of a transaction.

Attempts have also been made, such as in U.S. Pat. No. 8,650,405, to make PIN authentication more secure by incorporating user specific information to produce a PIN. Under this method, a user requesting access is then required to enter specified personal information to access the account. Using this information, a PIN is generated and used to authenticate the user. However, certain problems arise with such authentication methods. For example, a "man in the middle" attack may occur where a third party intercepts the user's information. If this were to occur, the user not only loses personal information, but also the ability to access a given item such as an account. If anything, this compounds the problem by giving the third party additional private information that may also be used to access other accounts.

Another example where user specific information is used to produce a PIN code is described in US published patent application 20120254963. Herein, a user is able to enter his or her credentials into a computer-like device such as a portal. After receiving the credentials, the portal produces a code that is viewed by the user. The user then speaks the code back to the portal, and if the code is correct, then the user is authenticated and granted access.

Some methods for securing a PIN authentication process may include a user entering a "subsequent code" related to an original PIN to verify the PIN code. In CA 2817431 A1, the user is asked for his PIN and a subset of the PIN. Using these two factors the user is authenticated.

In other methods such as described in US published patent application 20020184100, a code is generated and displayed to the user. The user then enters the PIN code to gain access.

A similar method is used in EP 2732594 A1. In this method, a user requests access to an application server. Having received the request, an application server sends out a PIN code to a synthetic voice PIN server, which then converts the PIN into audio stream. The audio is then played to the user, who then enters the code to gain access.

Still other prior art such as US published patent application 20130061057 uses a third party to authenticate a user with a mobile device. This application describes a method wherein a user encrypts a PIN with a separate code and sends it via a mobile device to a third verification party, which decrypts the PIN and authenticates the user.

In WO 2011124267 A1, a reference table of characters is used in connection with characters in an input table. Displaying characters in the reference table, the user is directed to select these characters in the given order on the input table. In one embodiment, the table is scrambled each time the user selects a different character.

In still other prior art such as described in US published patent application 20130047236, a geometric direction of two-paired characters is used to authenticate a user. Herein, a user specifies a direction by dragging his or her finger across a device, such as a display, to illustrate the correct geometric direction. The device then recognizes the said direction to authenticate the user, giving the user access to the system.

Similarly in WO 2011124275 A1, the positions of characters are used to authenticate a user. Under this method, a user is given different characters placed in different locations. In order to be authenticated, the user has to match characters in their correct positions.

Similarly, in US published patent application 20120323788 the geometry of the characters is again used to authenticate a user. The user not only has to enter the correct sequence of buttons, but he or she also has to press those buttons when they are in their specified locations.

Some inventions such as U.S. Pat. No. 7,992,007 simply rearrange characters or "buttons". The positions of these "buttons" are not used for authentication, but simply for protecting the code that the user inputs by changing the outward appearance of the GUI (graphical user interface).

In EP 2747366 A1, a dynamic PIN consists of a challenge-response method to authenticate a user. The user must arrange different pictures in a given order. The order changes each time. The pictures can also be used with a code, which is hidden in a barcode.

Matching is also used in some PIN authentication methods to further secure the authentication. In US published patent application 20120167199 a user is authenticated when two elements are matched together. This can be achieved through a device such as a touch screen. In some embodiments described, the area used to match specific elements can be made smaller for purposes of making the authentication more accurate.

Similarly, in CA 2765922 A1, a user is given up to three images. One is a base image, while the other is a more transparent image. To authenticate, the user must drag the correct element of the transparent picture over the correct element of the base image. In some embodiments, the elements in the base image can be rearranged when displayed to the user.

Another method authenticates a user when the user aligns three pictures over one another.

SUMMARY OF THE INVENTION

The present invention discloses systems and methods wherein a device, a website, an application, software or information such as an account is accessed through the use of a hidden PIN. PINs as referred to herein consist of a variety of user inputs or behaviors, movement of devices, movement of characters or images on a display, facial expressions, words or phrases spoken, tapping/swiping selecting schemes and/or matching schemes.

The methods and apparatuses described herein authenticate a user through the recognition of one or more factors derived from user interaction with a device. Some factors describe or characterize some action being performed such as but not limited to selection of characters or images, while other factors describe how the user performs the action during its entry or execution. Those "performance" factors may include techniques, mechanisms, characteristics, procedures, operations, maneuvers employed by the user in executing the action. For a non-limiting example, the time taken to execute the action is considered one of those "performance" factors.

As another non-limiting example, the shape of a figure drawn by the user defines a dimensional size and structure that could be matched to another shape previously drawn by the user, but the direction and speed with which the figure was drawn describes how the user formed the drawing or in other words, the "behavior" of the user in creating the figure, i.e., performance factors. Like something you know (i.e., a knowledge-factor) how you behave or perform an action or an activity is often distinctive and can also be analyzed and measured for later correlation with other actions or to use in authenticating a user.

These behavioral-metrics or performance factors may be recognized as discriminating features specific to the user, thus adding another factor to further security to other common authentication methods like but not limited to PIN or pattern entry. Thus, this invention augments and/or replaces common authentication methods such as PIN, pattern, or other knowledge-metrics authentication based on "something you know", biometrics or other authentication based on "something you are", electronic-metrics or other authentication based on "something you have", with "some way you perform" some action or entry. In this way, multi-factor authentication is achieved to augment other authentication methods that are commonly single in nature.

The methods and apparatuses disclosed consist of several unique and non-obvious ways to authenticate a user using combinations of multiple factors, multiple dimensions, hidden factors, and motion/position to further improve security. Authentication entry methods range from but are not limited to touch interfaces, tap interfaces, motion as measured by an accelerometer or other motion sensor, or pads or other interfaces that enable entry of something you know, something you have, something you are or some way you behave, and in some instances, combinations. In some embodiments, the entry method is tied to an image on a display or text output to a display, while in other embodiments, the PIN is hidden, where little or nothing is displayed.

In one non-limiting example, a tap PIN is combined with motion or position as determined by an accelerometer to add a factor of "motion or position" to the PIN. In this embodiment, the user may tap one or more elements while changing the position of the device or holding the device in a fixed position. Motion detecting and/or position detecting components can be used, in connection with the tap PIN (or another behavioral-metric or biometric), to determine whether the user is an authorized/authenticated user. Combining motion with other factors (position, location, etc.) increases the security beyond entry of a common PIN alone.

One method of the present invention utilizes a technique wherein a user is able to tap, touch, swipe, movement or otherwise provide selection or entry to a device component, a touch screen for example, a certain number of times to produce a new authentication factor. Mathematical functions may be utilized to produce the new authentication factors based on the number of taps, touches, swipes, or movements. In order to complete authentication, the user may need to produce several correct elements.

In several other methods of the present invention, a user is authenticated when he or she locates or indicates a PIN by scrolling through pages, rows or columns to find and select the correct elements from the pages, rows and columns. Similarly, a user may select elements to authenticate by rotating a virtual "wheel" on a touch sensitive device. In such methods, the actual PIN selected is hidden within the pages, rows, columns or wheel, such that the actual character or image is never selected, but rather the page, row, column, or wheel is chosen. Furthermore, the PIN is turned into a multi-factor authentication when the movement is recognized in addition and/or in place of the selection itself.

Matching elements may also be used to authenticate a user. In one method, a single element may be matched to multiple elements. However, in another embodiment matching may result in the formation of new elements or the disappearance of elements from a display screen, as well as the motion of matching being used as an additional factor.

Yet another embodiment of the present invention entails moving presented elements into specified locations to authenticate a user. However, in other embodiments a user may simply play a game or arrange a puzzle to authenticate.

A user may also authenticate by selecting a certain image within a larger image. After the image is selected it may then magnify. The user may then select another image within the magnified image. This process may be continued until authentication is complete.

A user may also authenticate by means of drawing an image. In some embodiments of this method the picture the user draws is never revealed, but is instead hidden from view.

Facial expressions, words or phrases or other user behavior or motion may also be utilized to authenticate a user. These behavior-directed methods may include blinking. Herein, a user may have to blink a certain number of times or in a certain way, such as a sequence of left and right blinks, to be authenticated.

DETAILED DESCRIPTION OF THE PREFERRED EMBODIMENTS

Before describing in detail the particular methods and systems related to data acquiring systems and components that provide additional levels of access and security, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments. The presented embodiments are not intended to define limits as to the structures, elements or methods of the inventions, but only to provide exemplary constructions. The following embodiments are permissive rather than mandatory and illustrative rather than exhaustive. The headings included in the Detailed Description below are for the convenience of the reader and are not intended to be limiting or all-encompassing of the methods, techniques, devices, and/or apparatuses described below each heading.

The invention disclosed consists of systems and methods to improve security, in some cases without disclosing the actual authentication code used for access. Unlike a common PIN (personal identification number) and other "knowledge-metrics" that describe "something you know" that are so prevalently utilized to authenticate users today, certain methods and systems of the present inventions described herein hide and/or combine a PIN, code, password and/or authentication entry with another factor to hide and/or "mask" the PIN. Each PIN or authentication code or knowledge-metric (something you know) or biometric (something you are) or electronic-metric (something you have) or behavior-metric (some way you behave or execute an action) or factor will hereafter be referred to as an "authentication method or a "factor" or an "authentication factor."

Figure 1:
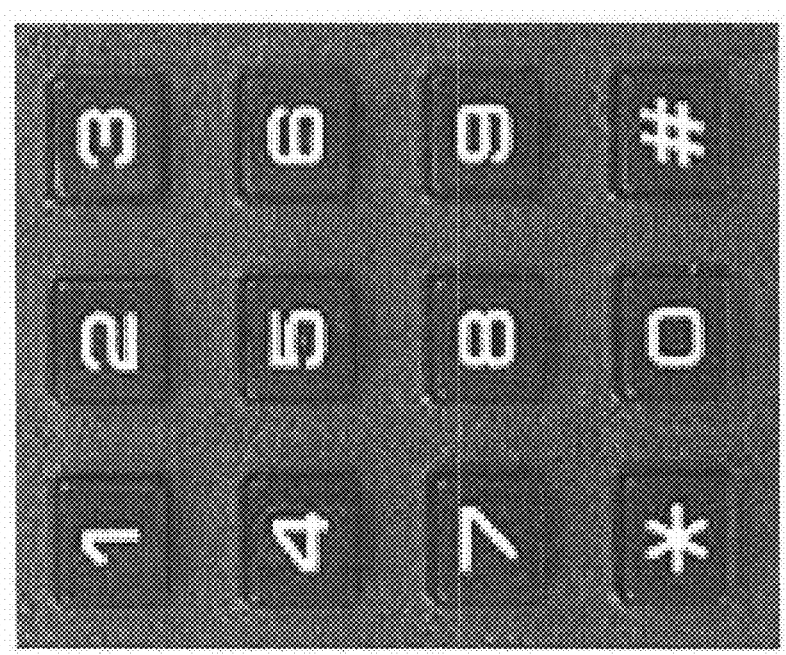
FIG. 1 shows a common keypad.

Many authentication methods and techniques, such as PIN entry via a typical keypad or equivalent, such as that shown in FIG. 1 as a non-limiting example, are vulnerable to various forms of attacks such as brute-force, man-in-the-middle, and eavesdropping attacks. Likewise, authentication methods where a user matches one or more characters, pictures, and/or objects, hereafter called "elements," to one or more other elements or stored elements are similarly susceptible to attack. In addition, other emerging forms of authentication such as but not limited to biometrics and electronic-metrics may also be stolen or intercepted.

Under this invention, innovative authentication methods interpret the identity of the user by measuring various metrics of "how" a user interfaces with a device or component, in particular with an input device or component. In some embodiments, physiological features are captured and measured in combination with other features such as actions, movement, or behavior. Such behavioral features will hereafter be called "behavior-metrics" since they serve to measure or designate behavior that is specific to an individual, where that behavior metric is distinguishable from a behavior metric another individual. Rather than other methods where the user simply selects a PIN by pressing a keypad or touch screen to determine a "match" between elements, the methods described herein measure and track multiple user input variables for authentication. Such variables will hereafter be referred to as "factors."

One such factor is movement performed by the user, where the movement in fact enters a PIN or designates a match between two or more elements. Herein, one or more algorithms track and match movements to record patterns of movements of a user. Such movements include but are not limited to movements on an x-y plane, while other embodiments include but are not limited to movements on an x-y-z plane. In some embodiments, behaviors may consist of tapping or dragging elements or both.

Another factor that may be taken into consideration is the position of elements when they are correlated or "matched".

If the position changes while one or more elements are selected or dragged to one or more other elements, the starting and ending position of the elements is considered a factor in the authentication as well as the selection and matching of elements.

In some embodiments, this position of one or more elements is dynamic, changing at various times during the authentication process. In such cases, one or more algorithms local or remote to the device authenticating the user may be used to track and record the proper positions and/or movements used to make a correct match. For instance, a user may drag an image around a display three or four times prior to dropping (releasing) the image atop the screen to add more security to the "matching" authentication factor.

An additional factor that may be taken into consideration in some embodiments is pressure applied to elements as they are tapped, selected, dragged, swiped and/or matched. Some embodiments include methods wherein a device including but not limited to a touch screen device, along with one or more algorithms, are used to track and record pressure inputs as they are applied to a touch screen or pressure sensing device. In one non-limiting embodiment, pressure may be applied either cohesively or unevenly. Cohesive pressure application may include but is not limited to applying pressure evenly between two or more geometrical points. Uneven pressure application, on the other hand, includes but is not limited to the application of pressure with different output forces during different intervals of time between two or more points.

In this embodiment, the difference in pressure and/or the amount of surface touched may be measured and used as a discriminating factor in authentication.

Yet another factor that may be considered in the determination of behavior is the area of detection caused by inputs relative to objects including but not limited to one or more of an individual's fingers, styluses and/or other apparatus or body parts. Physiological differences between the area, pressure resistance, and/or capacitance of a finger or stylus may vary, in some embodiments, enough to represent a differentiating factor between individuals.

Biometrics

In some embodiments of the present invention, biometric factors may be recognized and used during an authentication process to authenticate the user. Many of the factors previously described may be considered biometric factors based on certain physiological and behavioral inputs. Such factors may include but are not limited to area, pressure, direction, and speed of detection, as well as the position and/or movement of the position of the elements and/or the device during entry of another authentication factor. If the actual behavior-metrics derived from an interface is within a specified calculated range, the behavior is considered to be a match.

Likewise, some embodiments consist of a technique to calculate various parameters that can be descriptive of a user's touch as he or she touches and/or performs actions on the screen. These "touch parameters" include but are not limited to the area of the finger that touches the display, the capacitance, speed, and direction and how hard the touch is performed.

In other embodiments, the actual print of the body part being pressed may be taken into account. Although users may not be consistent with these parameters across all sessions, they do remain within some range of values that are enough to consider this a "biometric and/or behavior-metric touch parameter" as an additional factor to authentication. Although this method can be applied to other forms of authentication that utilize motion or movement as a means of input, this method of using touch parameters as a factor in PIN authentication is referred to as "Behavior Touch PIN" hereafter.

Touch interfaces as referred to herein may include non-limiting computer pointing technologies based on touch sensors, some with "haptic response systems", which include resistive, capacitive, surface acoustic wave (SAW), surface capacitance, projective capacitance, mutual capacitance, self-capacitance, and infrared and optical based touch technologies, collectively called "touch interfaces" hereafter. Touch and other interfaces are frequently accompanied with graphical user interfaces that provide feedback to the user as PIN entry is performed. In other embodiments, other non-display "haptic response" methods could be employed to provide the user of feedback including vibration, sound and the like.

The present invention consists of a non-limiting method wherein codes or numbers are generated from user specific behaviors and/or other factors derived from each user input. In some non-limiting embodiments, these behavior codes are generated from one or more recognition scores and are associated to one or more actions, movements or motions that describe the behavior. Codes and or numbers may also be generated from one or more features extracted from behaviors or factors. Behavior codes are referred to as "Behavior PINs" in general hereafter.

Behavior PINs may be utilized with any of the authentication methods as disclosed herein. Such methods may utilize behavior PINs to make processing and authentication more accurate and efficient. However, the use of such behavior PINs is not meant to be definitive and is non-limiting.

Behavior Pins

Behavior PINs are unique identifiers derived from behaviors and other motion or movement factors that may be recognized specific to an individual. In some embodiments, behavior pins may be translated into specific numeric or alphanumerical codes by one or more unique scoring methods. Under this invention, user behavior may be recognized by comparing specific characteristics of factors that only a specific user can make while performing a given action. The characteristics of these factors may be distinguishable from other individuals performing that same (or similar) action. These characteristics may include but are not limited to how a user performs some of the following actions: tapping, swiping, drawing, movement, expressions, poses, blinking, speaking, making sounds, speaking words or phrases, body movement, and virtually any behavior of an individual, called "salient behaviors" hereafter. Detection of these characteristics may be performed by user interaction with a sensing device such as but not limited to a keypad, touch screen, touch interface, proximity sensor, optical sensor, microphone, piezo or vibration sensor, buttons and/or motion sensing device or the like.

In some embodiments, these behaviors are purposefully pre-defined sequences of detectable movement of one or more graphics, objects or body parts formulated and defined by a user. Other embodiments, however, may utilize a technique wherein changes in a user's recorded behavior are recognized as the user dynamically changes behaviors over time. Such sequences of behavior will hereafter be referred to as "user-definable sequences" hereafter.

In other embodiments, behaviors are not pre-defined, but rather utilize patterns or "sequences" of how a user uses a device naturally, in the course of his or her operation of a device, application, website, and the like. In sharp contrast with traditional approaches of authentication, "usage-based passive authentication", as referred to hereafter, secures as you go by learning specific patterns that are distinctive to how a user uses a device, then utilizes these characteristics to generate a statistical model to compare to live or real-time interaction by a user.

Usage-based passive authentication is an invisible authentication method that uses behavior-metrics and other "patterns" that can be derived from the user to authenticate the user as the he or she uses the application. This eliminates the need for passwords, and authenticates the user based on how they use the device rather than burdensome passwords. Behaviors that may be recognized to authenticate a user as he naturally uses a device may include but are not limited to typing patterns and speed, sequences to access certain commonly used applications, sequence of various button presses, and/or any other factor previously mentioned that may be recognized as a "natural" movement, pattern, or behavior of the user, graphics or device.

In yet other embodiments, behaviors are not pre-defined nor derived over time during usage, but rather an algorithm defines such behaviors. Under such embodiments, the distinctive characteristics of performing some behavior may be modeled such that they can be recognized in more than one pattern. Thus, under this invention, a pattern or PIN may be "redefined" by locating elements in various locations on a display. However, as in one non-limiting example, the distinctive characteristics of the behavior are still recognized by the statistical model. Such methods and embodiments are called "generated behaviors" hereafter.

PINs may be generated from risk scores performed on segments of the detected behavior. When a specific user behavior and/or factor is detected, feature extraction may be applied to each frame, state, or dimension of the detected behavior. The feature sets are then recognized for their trained behavior and converted into risk scores. For authentication, it is desired to produce the same series of risk scores for different trained user behavior.

In some embodiments of the present invention, one or more variations of Hidden Markov Models (HMM) are used for the statistical modeling of user behavior. An HMM model may be trained with sufficient user data to produce reliable detection. During the training procedure, the HMM dynamically analyzes multiple sets of feature input data to model the behavior and to determine the locations where processing may be optimal as well as the ranges for risk scores.

The output of the training procedure is an HMM model and an associated risk score dictionary. If a risk score has already been generated for another user behavior, the risk score dictionary can be trained to generate the identical risk scores for other behaviors during detection. One non-limiting example that would generate identical risk scores for different behaviors is a user uttering a specific word or drawing a specific pattern.

In the case of voice input, voice features are extracted and then processed through means including but not limited to the HMM recognizer. In some non-limiting embodiments, the HMM recognizer will produce the behavior recognized (e.g. user spoke the word "Visa") and the risk score generated (e.g. "1A2!J"). However, in the case of pattern input on a touch screen, the sequence of touch events are extracted and processed through the HMM recognizer. The HMM recognizer will produce the behavior recognized (e.g. user drew an exclamation mark) and the same risk score generated for the detected voice (e.g. "1A2!J").

In some embodiments, in lieu of a specific risk score, risk score ranges are used to match the risk score to a specific character (e.g., numeral, letter, or symbol). Based on these ranges, each risk score may be interpreted as a given character, producing a code such as but not limited to a PIN. The PIN produced is matched with a recorded PIN to authenticate the user. In certain embodiments behavior is matched to fixed, inflexible cryptographic keys within cryptographic devices. Various authentication methods and systems are described and claimed in the following co-owned patent applications, all of which are incorporated herein in their entirety: Sound-Directed or Behavior-Directed Method and System for Authenticating a User Executing a Transaction (filed Feb. 10, 2016, assigned application Ser. No. 15/040,984); Sound-Directed or Behavior-Directed Method and System for Authenticating a User Executing a Transaction (filed Feb. 10, 2016, assigned application Ser. No. 15/040,984); Biometric, Behavioral-Metric, Knowledge-Metric, and Electronics-Metric Directed Authentication and Transaction Method and System (filed Jul. 5, 2016, assigned application Ser. No. 15/202,515); and Multi-Instance Shared Authentication (MISA) Method and System Prior to Data Access (filed Jun. 23, 2016, assigned application Ser. No. 15/191,456).

The present invention consists of several methods that hide and/or mask the authentication method so that it is not easily reproducible by another individual. Such methods are called "hidden authentication methods" hereafter.

Tap Pin

Hidden authentication methods track not only the PIN, code or the "matching" of elements, but also the manner by which an individual enters the data. Several hidden authentication methods may be applied to a standard keypad or other sensors on a device such as but not limited to sensor pads and/or touch interfaces that detect touch or taps. One such hidden authentication method that interprets tapping a PIN and could be applied to one or more sensors on a device or even standard keypad as shown in FIG. 1 to improve authentication is called "Tap Pin".

Herein, a user is given a series of one or more elements. Elements may include but are not limited to numbers, symbols, letters, pictures, objects or any other non-limiting character. In order to select a PIN, a user taps each element with respect to each element's given geometric location or position. The number of taps a user applies to an element may redefine that element with the use of one or more functions as applied by one or more algorithms. The number of taps may control how the element is redefined, and thus the behavior or pattern of how the taps are performed may be used as a contributing factor for authentication.

In some non-limiting embodiments, factors including but not limited to the locations pressed or the actual element values pressed, may be utilized to authenticate the user. Herein, the user's actual PIN is not merely the element values he or she presses, but rather the actual PIN is masked by a combination of the number of taps, the manner the taps are entered (e.g. speed, timing, area, pressure, etc.), and in some embodiments, the actual values of the elements pressed, swiped, dragged or otherwise interacted with.

Math Pins:

In some embodiments, each tap (pressing) of an element may be interpreted as a mathematical function. Functions may include but are not limited to addition, subtraction, multiplication, division, and any other non-limiting function or combinations. In some embodiments, functions may be staggered among numbers depending on the element that is being pressed. In one non-limiting example, the number 3 may be tapped to indicate an addition function, while the number 4 may be tapped to indicate a subtraction function. This pattern may continue for two or more elements as in some non-limiting embodiments. Thus, although the values may change, the math is the real pin under such embodiments, as well as or in place of the actual values of the elements chosen.

Figure 2:
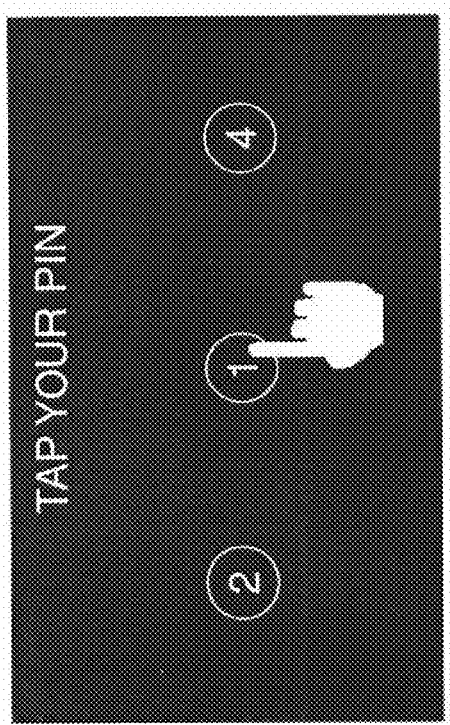
FIG. 2 illustrates a method to tap elements (images, characters, letters, pictures, and the like) with an example where the authentication is achieved by mathematical functions of the entry, not the elements actually selected.
Figure 2:
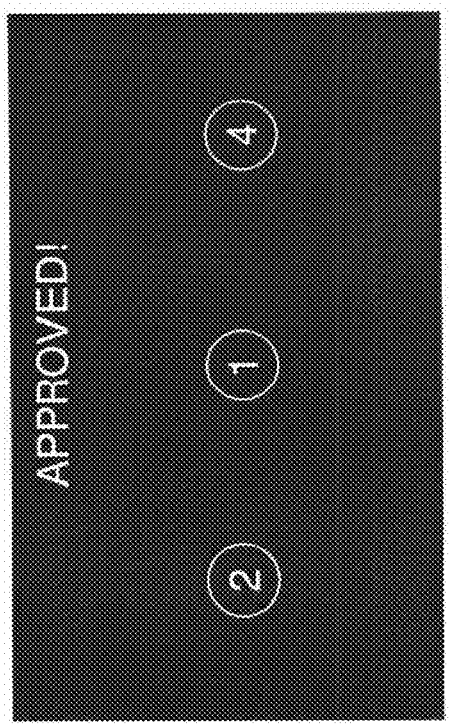
Figure 2:
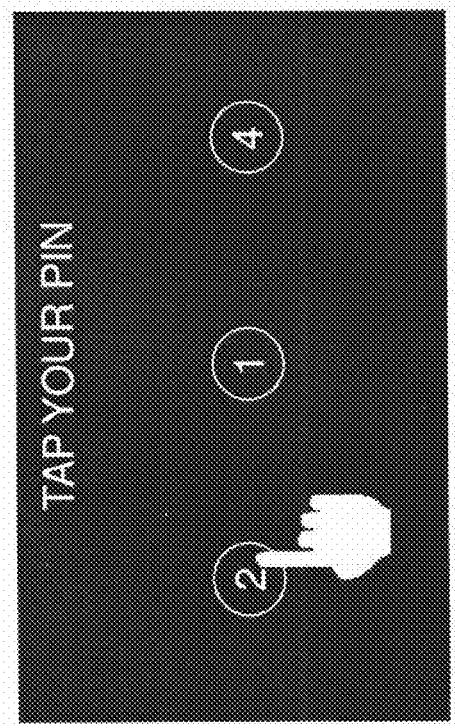
Figure 2:
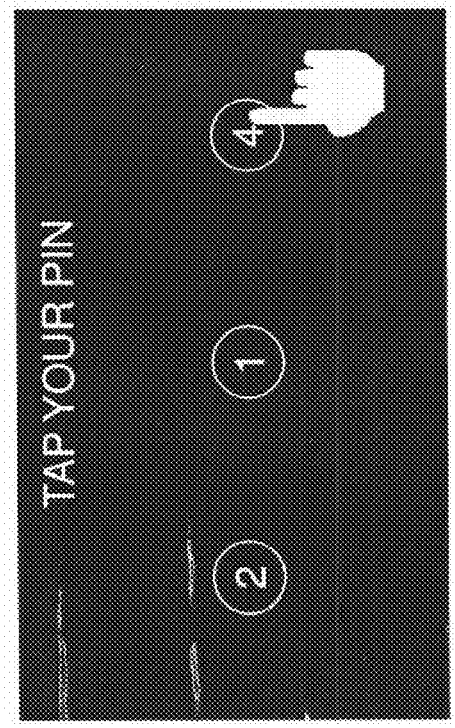

A non-limiting example of the method described is illustrated in FIG. 2. Herein, a user may tap a number 2 element twice to achieve 4 (by multiplying the element value by the number of taps). The user may then tap the number 1 three times to get the number 3 (by adding 1, 3 times), and the number 4 twice to get 8 (by multiplying 4 by two). Herein, methods that utilize mathematical functions as part of actions including but not limited to taps are called "math PINs".

In some embodiments, one or more functions may be interchanged depending on the time or number occurrence of the authentication attempt. Adding could be used during one authentication attempt, while the function of subtraction could be used on the next attempt. As in one non-limiting example, a user may press the number 2 twice to get 4 (by means of addition) during one authentication attempt. However, pressing the 2 twice may subtract 2 during the next attempt.

Users may be authenticated by one or more additional factors. Such factors may include but are not limited to the element pressed, the element reached as a result of the mathematical functions applied to taps, the number of taps, swipes, etc., the order in which elements are tapped or reached, the area of the tap, the force with which each tap is executed, and the like.

In some embodiments, tapping each element the correct number of times may be enough to authenticate a user. Herein, a user may redefine a series of elements, including but not limited to numbers, one or more times until authentication is complete. In other embodiments, the user may have to complete these actions in a specified order or sequence for authentication to be successful.

In some non-limiting embodiments, a user only has to reach a specified value to be authenticated. This may be achieved multiple ways, regardless of the element tapped. For example, a user may need to reach the number four. The user may tap the number 1 four times or the user may press 2 twice. Either way the target value is reached. With such math PINs, the objective is not to tap a certain value, but to tap to achieve a specific value with one or more taps in a way where the actual PIN is not easily recognized.

Pin Find

Figure 3:
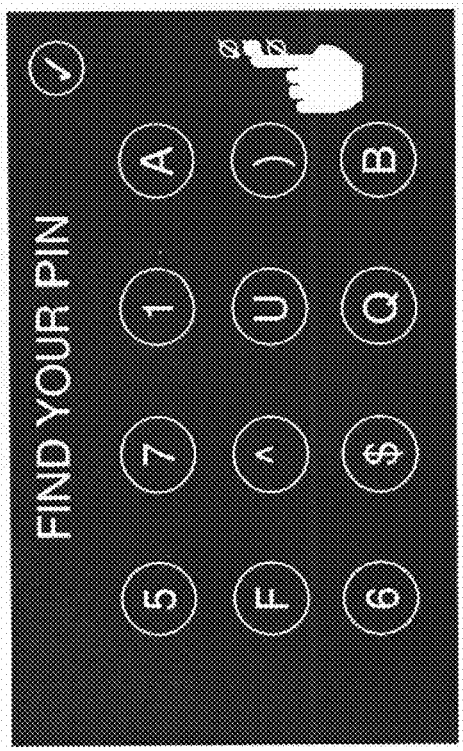
FIG. 3 illustrates a method to find a PIN by changing the graphics on the display and selecting the graphics that contain the user's elements.
Figure 3:
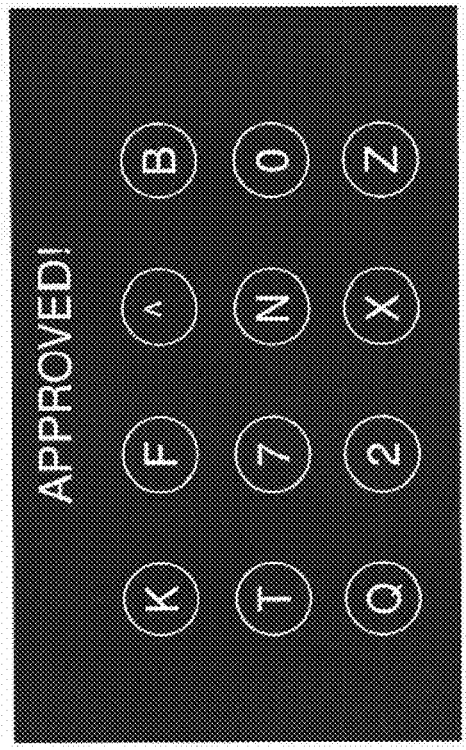
Figure 3:
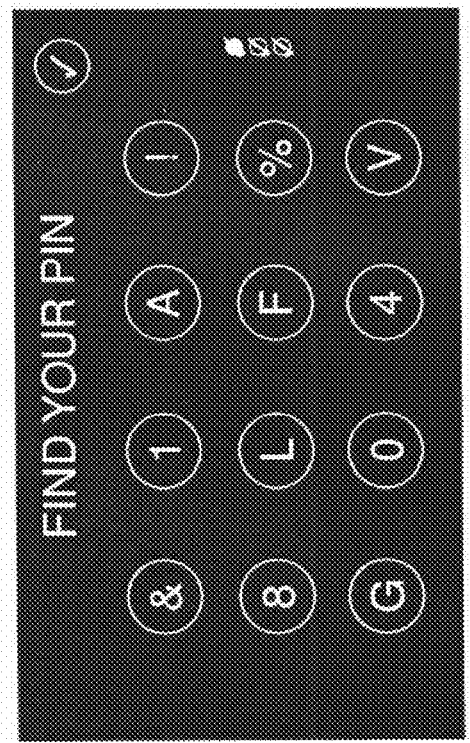
Figure 3:
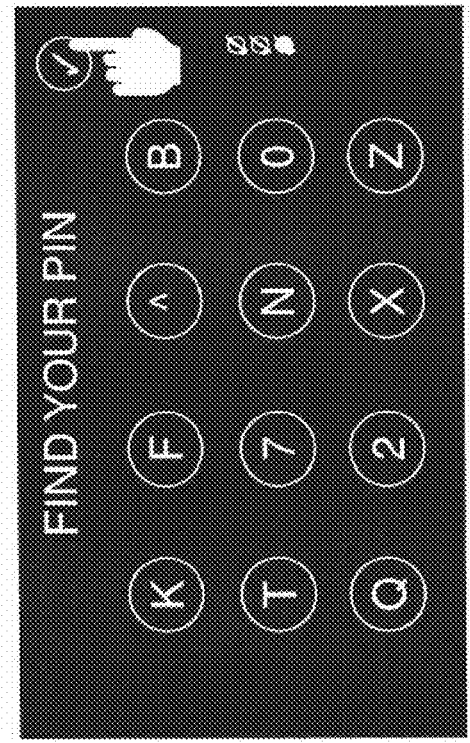

Another hidden authentication method of the present invention enables a user to authenticate and gain access by selecting one or more given elements containing the user's actual PIN. As illustrated in FIG. 3, a user is able to move a smaller group of elements within a larger group of other elements to find the graphical representation (the correct group) containing the given PIN. These other elements not representing any element value of the PIN may be randomly displayed in certain embodiments in order to make the PIN less visible to those who may be overlooking during an authentication session.

Those versed in the art will recognize that moving a page, element, or other content on a display may be performed by a user using voice, eyes, touch, tap, swipe, scroll, or any other non-limiting means to move graphics, text or characters on a display. In some embodiments, the user may select the page containing the given PIN to authenticate. The user may select a given page using one or more behaviors performed using one or more actions by using voice, eyes, swipe, scroll, or other non-limiting methods and the like. In yet other embodiments where the complete PIN is visible to a user, the user is able to authenticate by selecting the correct elements as displayed to the user. Hidden methods where users find a PIN within a multitude of elements on a page, row or column are called "PIN find" methods hereafter.

Tumbler Pin

Figure 4:
FIG. 4 describes a dynamic tumbler PIN method where rows are scrolled and selected containing the authentication elements that are contained in each row.
Figure 4:
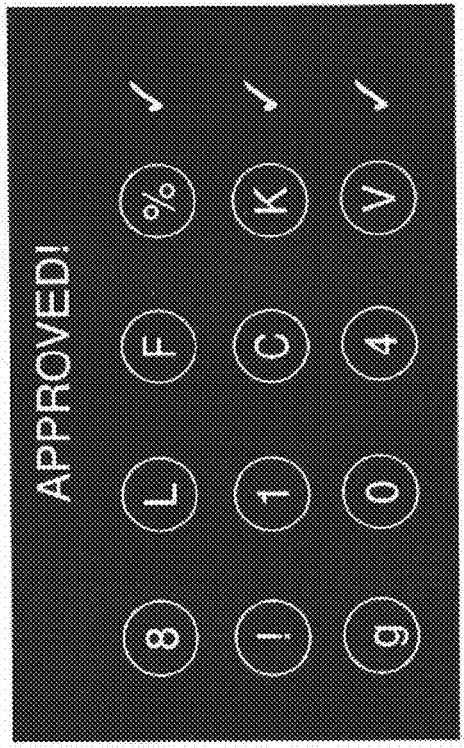
Figure 4:
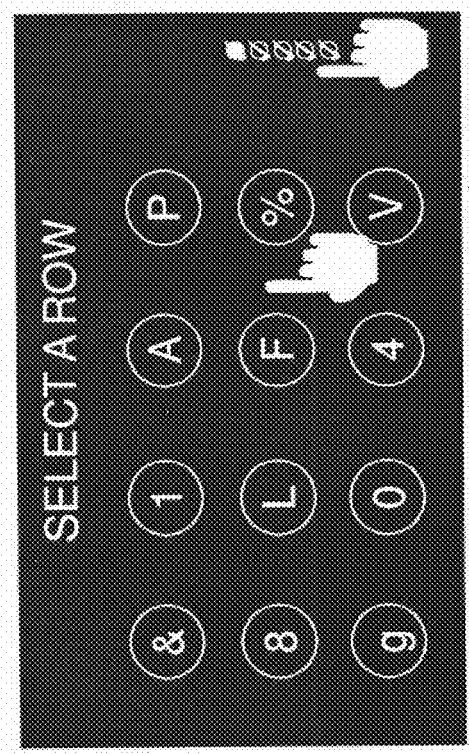
Figure 4:
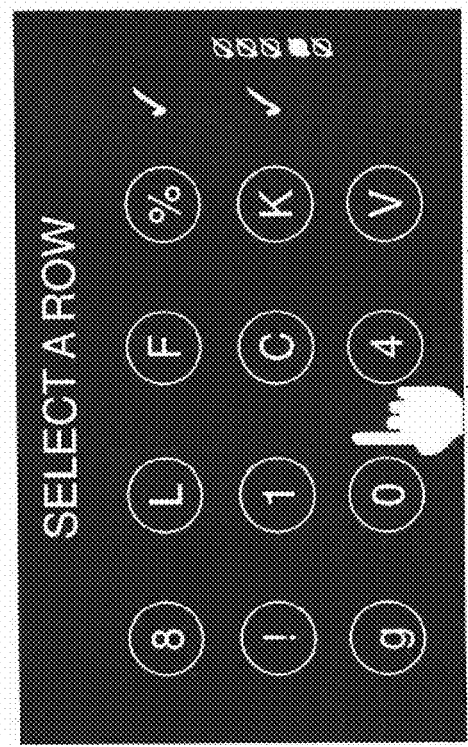

Another PIN find method is called "Dynamic Tumbler Pin" hereafter, where a user may be authenticated by scrolling through a series of rows and select rows that contain the correct specified one or more elements or element values of the PIN within one or more groups of elements. As shown in FIG. 4, one or more elements of a PIN may be contained in one or more rows and/or columns. In some embodiments, the user may be required to select the rows in a specific order, while in other embodiments the order may not matter. One or more factors must be met for a user to be authenticated. Such factors may include but are not limited to selecting the correct row, performing the correct additional selections of a row, or the time a row is selected. Additional features that may augment or replace other distinguishable features may include but are not limited to amount of force, type, or direction of motion. In yet other embodiments, a user may be required to authenticate at a given time or within a given time limit.

Scroll Method

Figure 5:
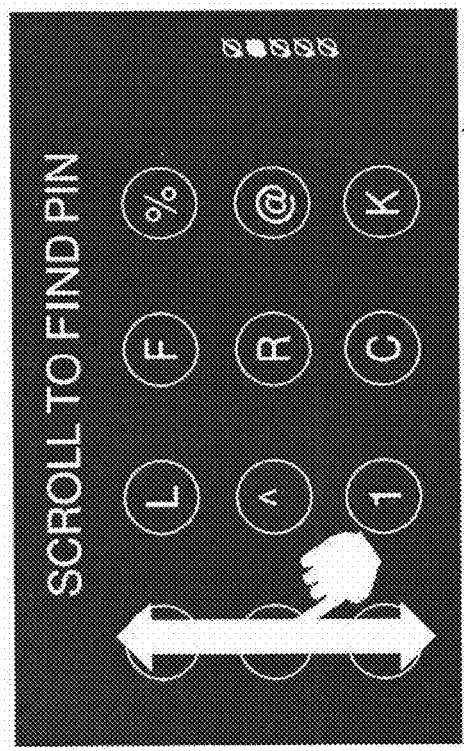
FIG. 5 illustrates a scroll method wherein rows, columns and angles may be scrolled to find elements, much like a sliding puzzle or word across game.
Figure 5:
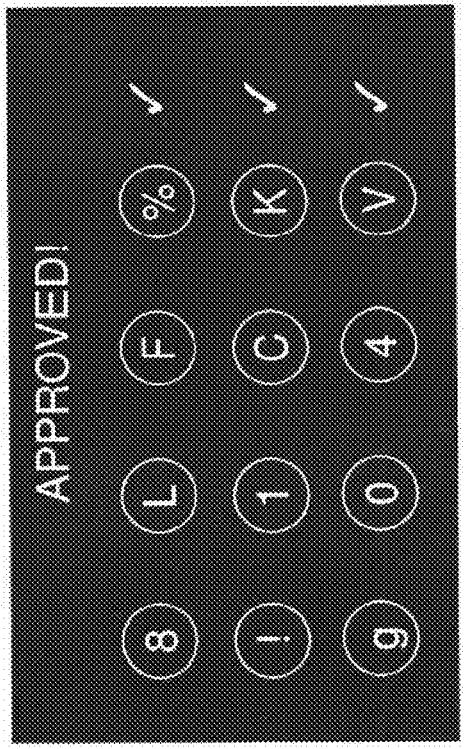
Figure 5:
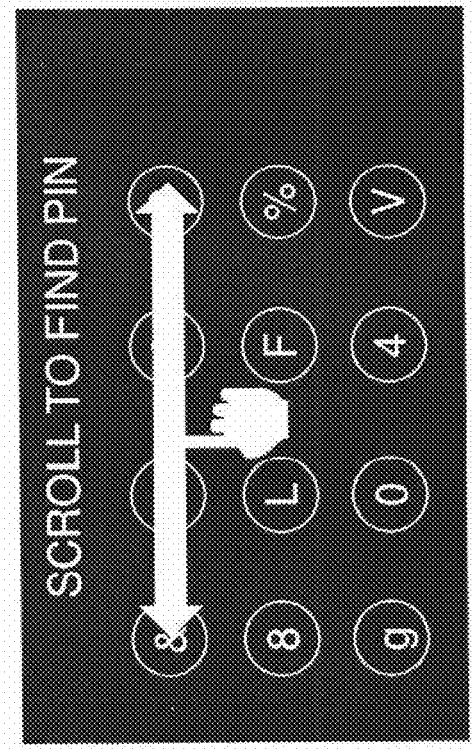
Figure 5:
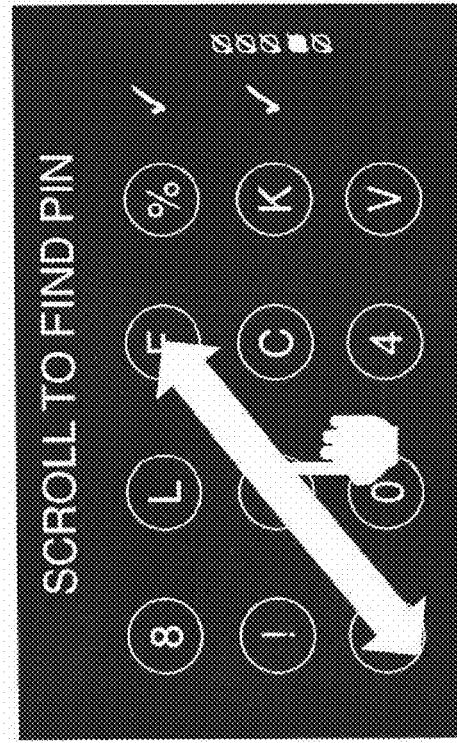

In yet another PIN find method of the present invention, an authentication credential set including but not limited to a PIN is selected by "scrolling through" a set of elements. Under this "scroll method" as it will be referred to hereafter, a series of elements is shown to a user via means such as but not limited to a touch screen device as shown in FIG. 5.

Much like a sliding puzzle or word across game, a series or set of elements may include but is not limited to being displayed to the user in the form of rows, columns, angular formations, lines and/or combinations such forms. In some embodiments the user can use a swiping motion to move through a series of elements. Scrolling motions include but are not limited to moving, tapping and/or swiping right, left, up, down, and/or at angles. The user is authenticated when the correct elements of the authentication credential set is displayed on the screen "hidden" among all the other element values displayed on the screen as shown in FIG. 5. As with all hidden and motion augmented PINs, selected elements are never specifically identified, keeping the PIN unknown to the wandering eye.

In some embodiments, the order by which each element is selected may be used as a factor for authentication, while in other embodiments the order of selection may not matter. For example, in one instance a user may be required to select specified elements in a given order, while in another instance the user may only be required to select the specified elements in any order. In some embodiments of the present invention, the location of one or more elements relative to one or more other elements may be used as a factor. Other factors may include but are not limited to the direction of swiping.

Wheel Method

Another hidden authentication method of the present invention comprises using a shape including but not limited to a wheel, which is rotated to authenticate a user. Herein the user may scroll through one or more elements in a rotating fashion (either clockwise or counter clockwise), selecting one or more correct elements for authentication. In some embodiments the user may rotate the wheel to one or more specified angles, thereby indicating a specific element for authentication. One or more markers may indicate these angles.

In some embodiments, the wheel may contain a beginning point, where elements are illustrated, and an ending point, where elements are hidden or recessed. The user may also select an element by means including but not limited to touching the element on a touch screen device.

In some embodiments, the wheel may comprise a fixed array of elements. However, in other embodiments one or more algorithms may alter the formation of the elements, making the wheel dynamic. Elements may also be displayed to the user in a hierarchal fashion. One non-limiting example comprises a user rotating a wheel, after which, new elements may be illustrated at a given point or angle. In another non-limiting example, one or more algorithms may use a formerly displayed element to produce a subsequent element.

In some embodiments, each time one or more elements are rotated by the user the length of a specified angle including but not limited to 360 degrees, the one or more elements may be changed into one or more other elements by one or more given algorithms. This angle will hereafter be referred to as the "angle of generation."

The angle of generation may include but is not limited to a fixed angle, or a dynamic angle based on a given factor. The given factor may include but is not limited to the time it takes the user to rotate the given wheel. In one non-limiting example, a user may rotate the wheel for a predetermined amount of time causing the angle of generation to change. Using one or more algorithms, element generation may include but is not limited to random generation, or generation relative to the given angle at which each element changes.

In some embodiments, the given algorithm may comprise one or more trigonometric functions such as but not limited to sine, cosine, tangent, cosecant, cotangent, and/or secant. One or more of these non-limiting trigonometric functions may be used in correlation with either the angle of generation, the previous element, or elements that correspond with the previous elements as inputs.

Factors used herein may include but are not limited to the time it takes for the user to select the one or more elements, the angle at which each element is selected, the direction of the rotation, the type of element, and the one or more elements surrounding the selected element or their order as relative to the selected element.

Dynamic Pattern Pin (Sequential Element Matching Using Previously Matched Characters to Make Subsequent Matches)

Another hidden authentication method of the present invention consists of selecting and dragging one element and orientating it such that it is atop another, different element, then another, and so on. Such PIN methods will hereafter be referred to as "pattern PIN" methods.

Each "match" is made by hovering one or more elements over subsequent elements. In one non-limiting embodiment, a second match of two or more elements may be executed consecutively after the matching of two or more previous elements using either one or both of the elements from the previous match.

In one non-limiting example, a first element may be dragged and matched with another element. Herein, the original element is more visually prominent over the second element after the match is made. Using the original element, a user is able to make one or more secondary matches with a different element.

In an alternate embodiment, the second element (or the element that the first element is dragged and hovered over from the previous match) may be used to make subsequent matches.

In one non-limiting example, a user may drag a first element and match that element with a second element. Being distinctly visible over the first element, the second element may be utilized by the user to make one or more secondary matches. The user may then make subsequent matches using the element that the original element was previously matched to.

Figure 6:
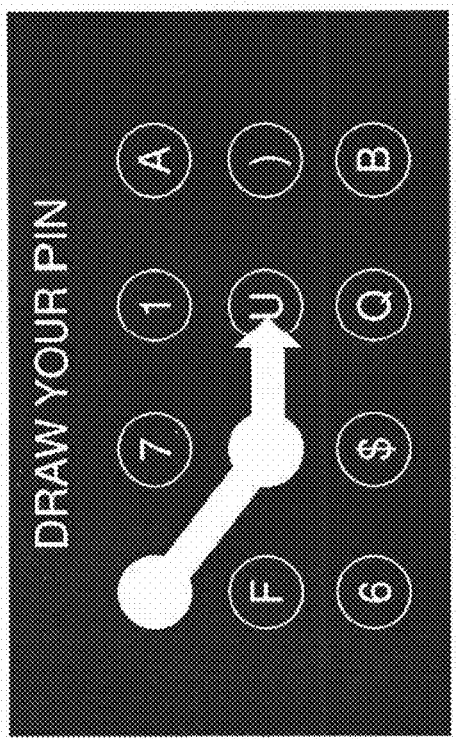
FIG. 6 illustrates dynamic pattern PIN method wherein selected elements are hidden after each selection.
Figure 6:
Figure 6:
Figure 6:
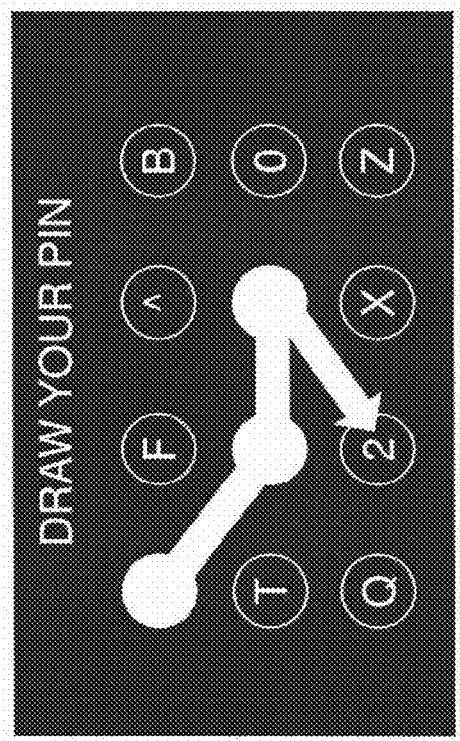
Figure 7:
FIG. 7 illustrates another dynamic pattern PIN example with different positions for the elements, but with the same, rotated pattern.
Figure 7:
Figure 7:
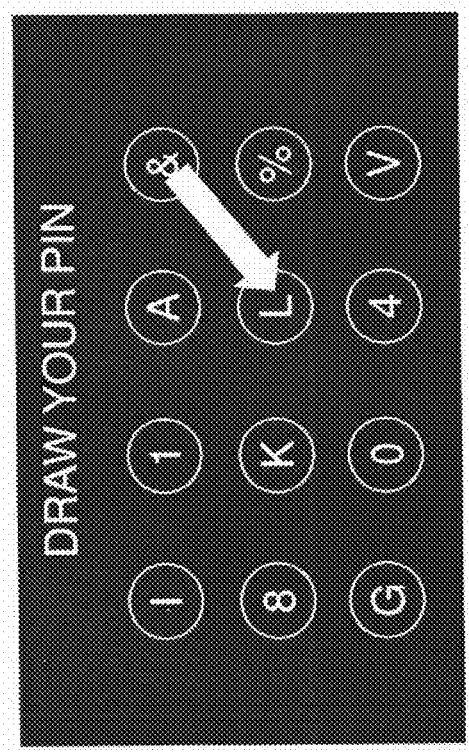
Figure 7:

In some non-limiting embodiments, as illustrated in FIG. 6, elements may be hidden after they are chosen or matched. In addition, the elements on the page may change after the selection of each element. Depending on one or more factors including but not limited to the occurrence or time of the authentication session, the orientation of the elements may also be dynamically changed while keeping the same pattern for recognition as shown in FIG. 7. This method will be called "dynamic pattern" hereafter.

Yet other non-limiting embodiments consist of a method wherein elements may be matched by hovering one element over another for a predetermined and/or calculated time period. Another method entails elements changing form and/or value when they are matched.

In one non-limiting example herein, a user may make a second match with the second element from the first match, while using the third element from the third match to execute a fourth match. This process may be continued until the user is authenticated. This method of matching elements in a hierarchical manner, one after another, is referred to as "Sequential PIN" and randomizing the positions of the elements is called "Dynamic Sequential PIN" hereafter.

Element Matching to Form New Elements

Another method of the present invention utilizes a technique wherein one or more elements are produced from each match. When two or more elements are matched together, one or more new elements are formed and/or displayed to the user. The matches made to form the new elements, as well as the matches made with the new elements authenticate the user if made correctly. This method will hereafter be referred to as a "PIN forming" method. The elements produced may include but are not limited to elements that are retrieved from memory. In one non-limiting embodiment, elements may be produced upon training and stored in memory including but limited to a database. The elements may then be retrieved for use during authentication.

Figure 8:
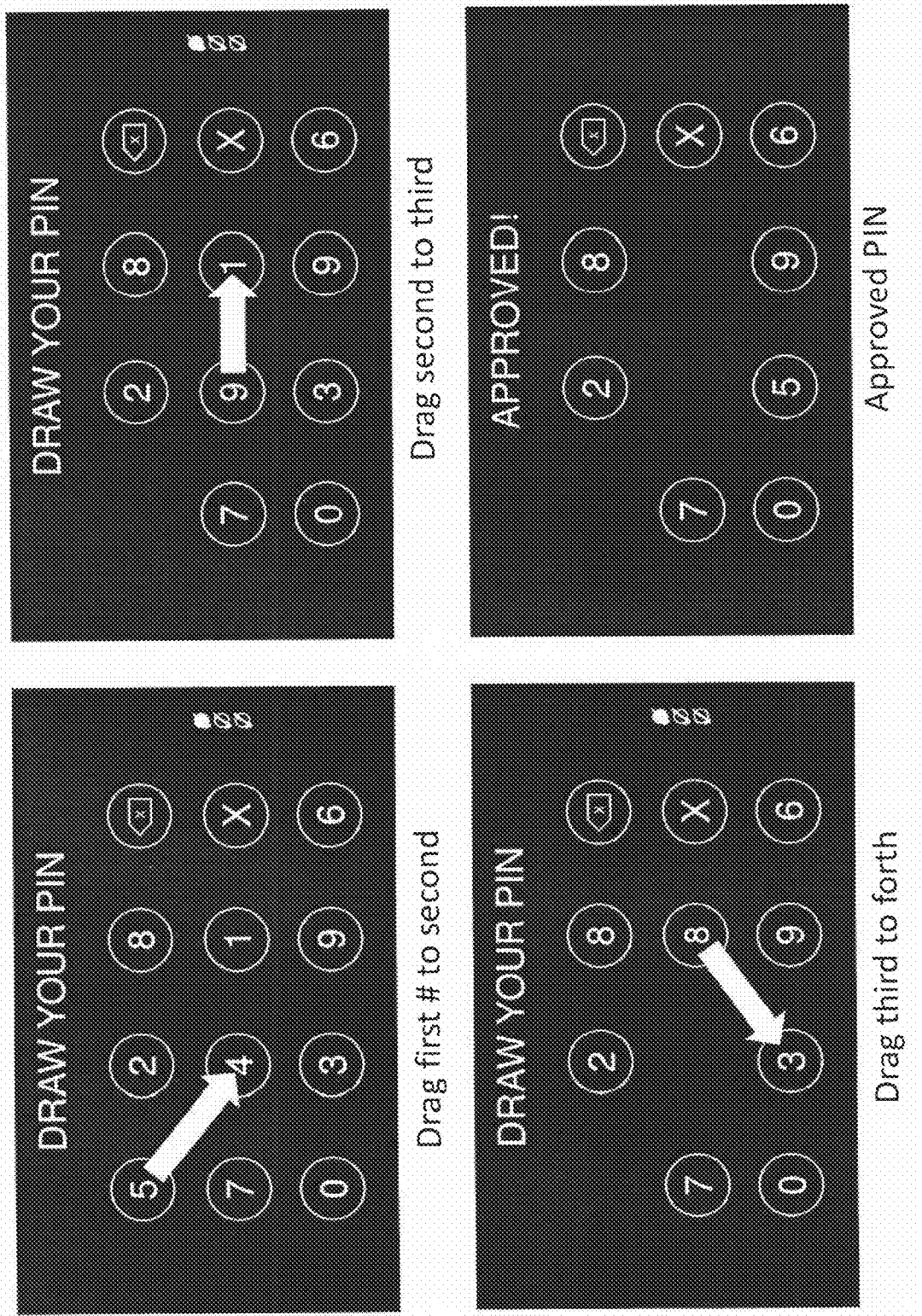
FIG. 8 illustrates a disappearing PIN method wherein the elements disappear after a user draws the pattern.

In other non-limiting embodiments, elements may be produced mathematically based on each match, as illustrated in FIG. 8. In one non-limiting example, as two elements may be matched together, the combination of such elements may be represented by a polynomial. This polynomial may then be factored into three separate segments, each factor representing a different element.

Illustrated in FIG. 8 is a non-limiting example of PIN forming. Herein, the 5 is dragged to the 4 to produce a new element of 9 using a function of addition. The 9 is then dragged to the 1 to produce an 8 by means of subtraction. Thereafter, the 8 is matched with the 5 to produce a new element of 3, authenticating the user. Other values and mathematical operations can be used to generate the final "3" value that authenticates the user in this example.

Disappearing Pin

Other variations of this embodiment enable elements to disappear as they are selected and dragged from one element to another element. As each element is selected by hovering the first element over the subsequent elements for some time period, elements disappear, thereby partially hiding the elements. Embodiments that utilized this selection and dragging one element to another are called "drawing PINs", while elements disappearing as one element is dragged to another is called "disappearing PINs" as also shown in FIG. 8.

Figure 9:
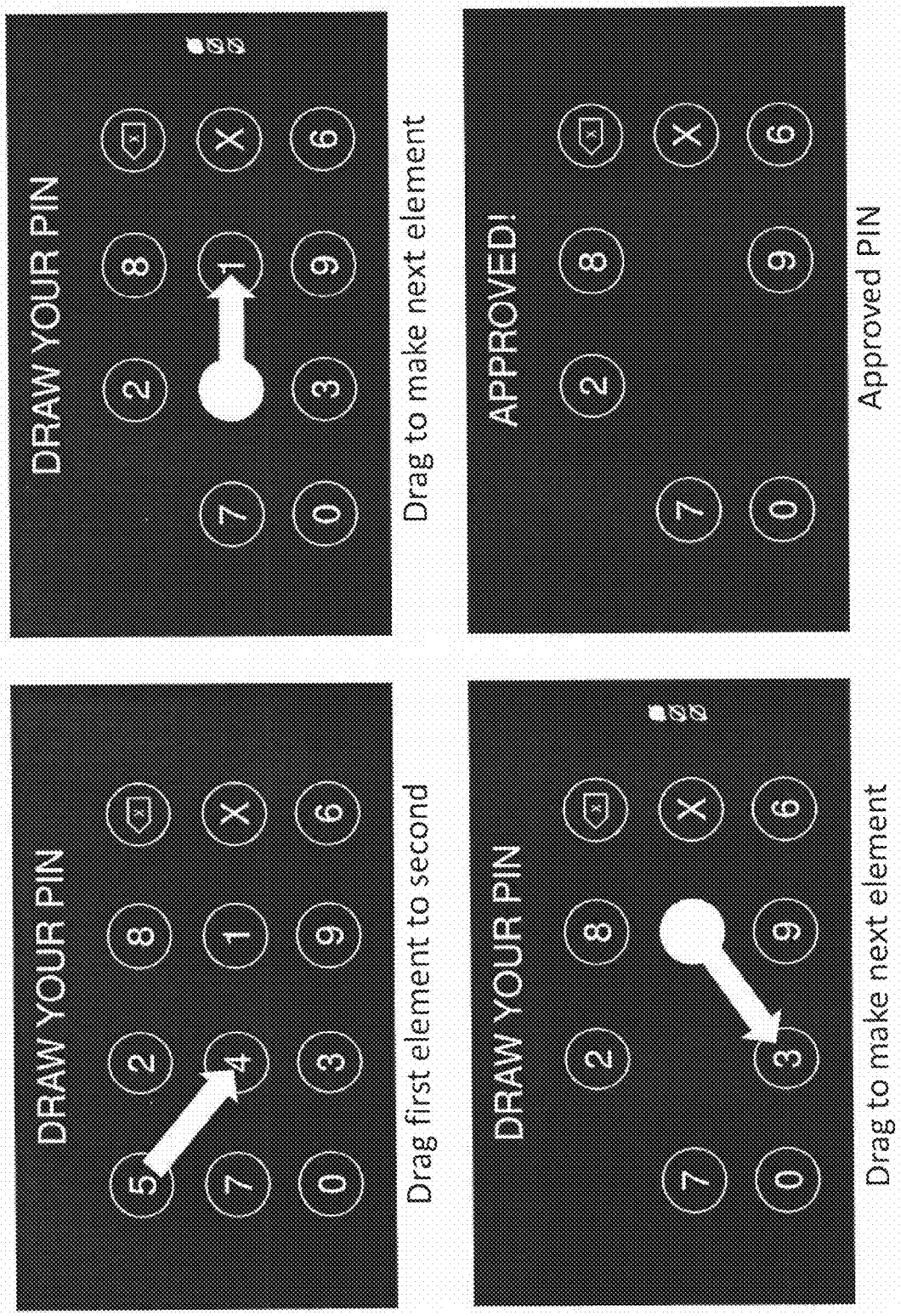
FIG. 9 shows a disappearing hidden PIN method where the elements disappear after selection.

In one embodiment, new elements can be matched correctly with the same one or more different elements. However, in another embodiment, each element produced from a match may only be matched with one or more elements like or similar to the element produced. Elements may be hidden or disappear when they are matched as shown in FIG. 9.

In some embodiments, elements produced consist of a limited number of elements that are actually useable for making matches. As in one non-limiting example, when three elements are produced, only one of those elements may be an actual element capable of being matched. While increasing the difficulty of making a correct authentication, this method forces a user to correctly remember a specific element as well as the correct one or more elements to which that element can be matched.

Elements may also be produced or combined autonomously as in one method of the present invention. Elements produced may be similar to their surrounding elements or they may be completely different. For example, (non-limiting), a picture may be added to a series of numbers. Autonomous production may take place when a certain variable is executed. In one non-limiting embodiment, a time limit may be reached, causing new elements to be produced automatically. However, in another non-limiting embodiment, a user may fail to authenticate, causing the production of new elements to occur.

The User Controls the Authentication

One method wherein new elements are produced from previous matches utilizes time to regulate which elements are produced. Herein, the user controls how he or she wants to be authenticated.

In one embodiment, different types of elements as well as different numbers of elements may be displayed and produced depending on the amount of time a user holds an element over a given geometric location to make a match.

In one non-limiting example a user may drag and hold an element over a position for four seconds. The time of four seconds indicates to the one or more devices to display three elements in the form of letters. Yet another embodiment consists of a user dragging an element from one geometrical point to another geometrical point in a specified amount of time in order to choose the type or number of elements that are displayed.

For example a user may drag an element between two points for two seconds. This time of two seconds would then indicate four new elements in the form of numbers to be displayed.

Time Limit Applied to Number of Elements Displayed and Scrambling

A time limit may also be applied to the number of elements that are made available to a user. When additional elements are added, more emphasis is put on the ability to locate either the original elements or the positions of such elements.

In one non-limiting example, a user may use up a specified amount of time to provide element matching for authentication. After the time provided to the user has expired, one or more new elements may be added either evenly or unevenly. After such elements are added, a new time limit may be applied. If the user fails to authenticate within the new time limit, the process will repeat.

In one embodiment, a failure to authenticate within a given time limit may be incorporated into the risk and recognition scores produced by the one or more devices. In one non-limiting example, if a user fails to authenticate within a given time limit, the risk score will increase and the recognition score will decrease, thus resulting in a shortened time limit being applied to the next authentication attempt.

In other embodiments, time limits may also be applied to the scrambling of elements. Time limits can be either fixed or variable.

Time limits can be created and/or applied during occurrences including but not limited to failure to authenticate within an originally specified time limit. A time limit may also be created and/or applied due to an increase in a risk score and/or a decrease in a recognition score. In one non-limiting example, a user may fail to authenticate within a given time limit. This will increase the risk score, and decrease the recognition score. Accordingly, one or more elements are then scrambled.

Dynamic Behavior

Figure 10:
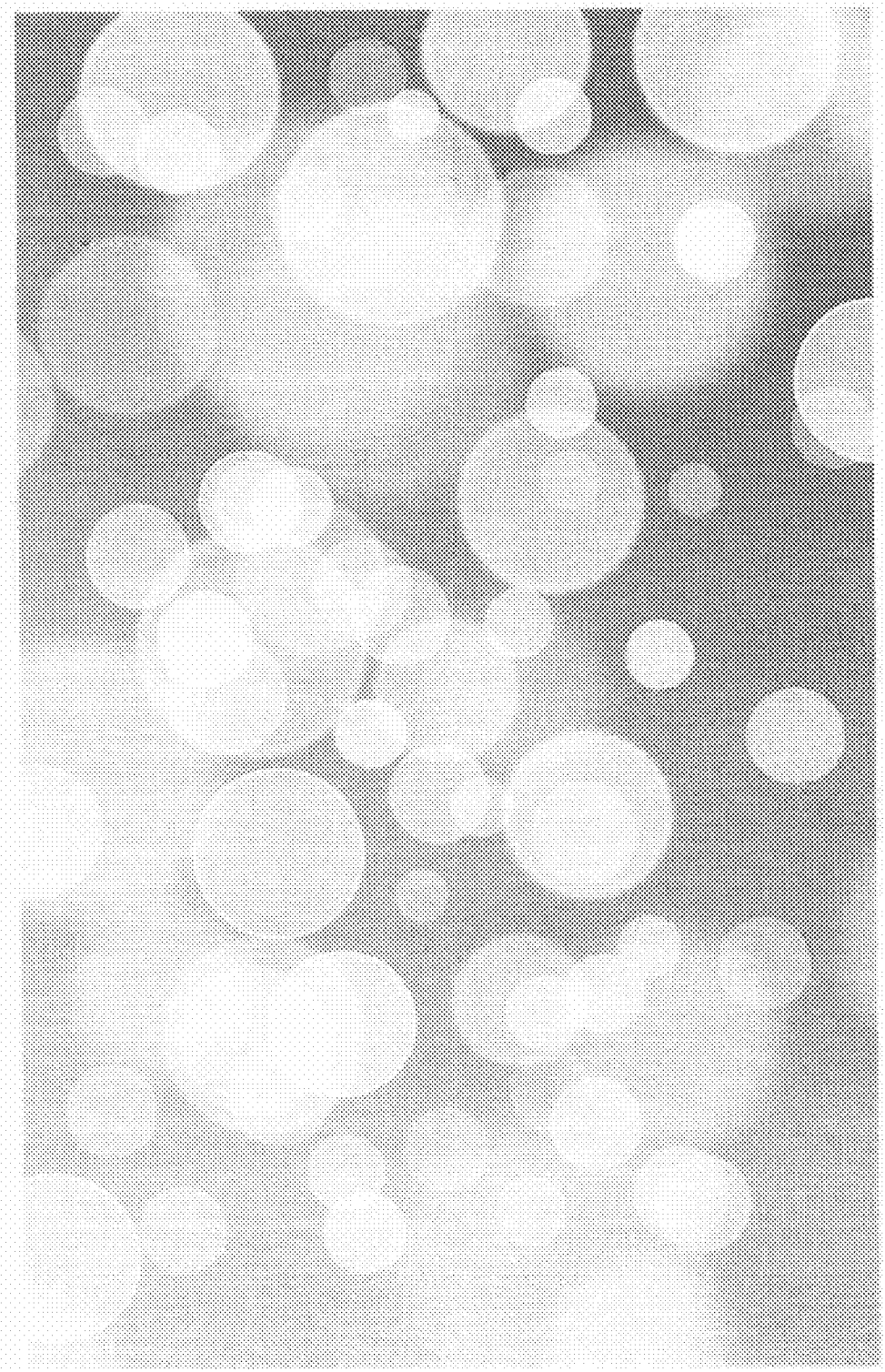
FIG. 10 describes dynamic movements via selecting and dragging objects in motion, in this case, bubbles.

In one method of the present invention, one or more elements may be illustrated on a device including but not limited to a touch screen device. Moving one or more elements around in a manner known only to the user may authenticate the user. Herein, elements may include but are not limited to, colors, pictures, images, letters, characters, bubbles and/or other objects as illustrated in FIG. 10. As a user selects and/or drags each element of an element authentication set, several factors may be used to authenticate the user. In some embodiments, factors may include the drawing or picture made, the pressure applied when making the action or behavior, and the time it takes a user to move or select one of the elements as non-limiting examples.

Game Behavior

A form of dynamic behavior method that also consists of moving elements is called "game behavior" or "game ninja un-passwords" hereafter. In this method, a user may play a game to perform behavior that is then recognized to authenticate a user. Since users are familiar with playing certain games, this method utilizes behavior that is quite familiar and distinctive to a user to unlock a device, login to an application, and other authentication applications.

Game ninja un-passwords are snippets of games that a user can quickly play that act as an authentication unique to the user. The unique speed, direction, timing, area of finger or stylus, actions and other behavior that a user takes to play a specific game are recorded as user identifiers that can be used for authentication.

Figure 11:
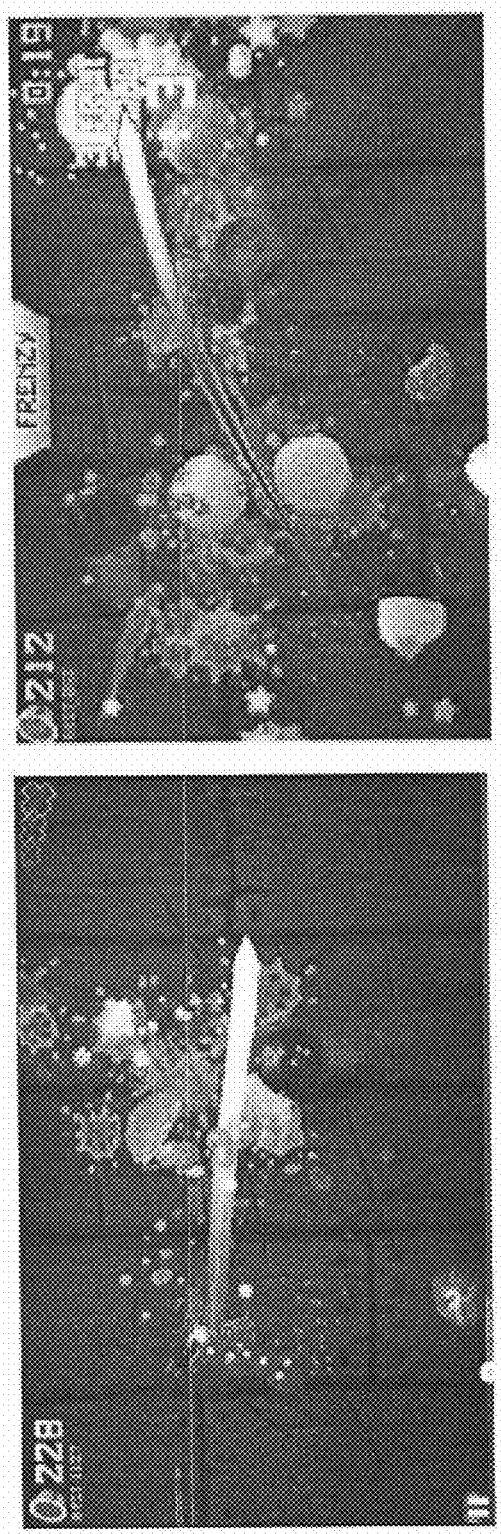
FIG. 11 illustrates an example of game behaviors, wherein behavior is recognized by playing a segment from a familiar game, in this case Fruit Ninja.
Figure 12:
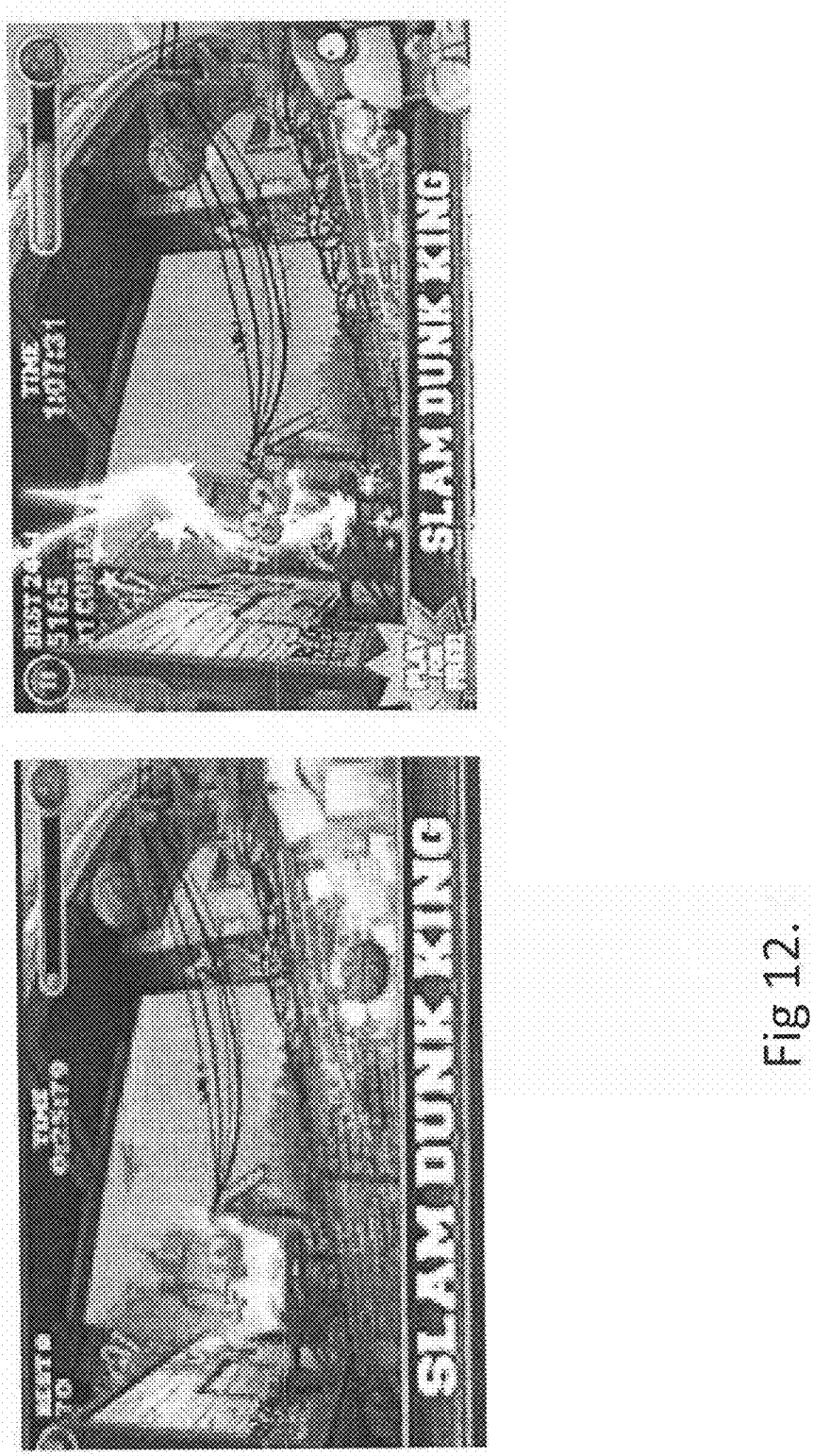
FIG. 12 shows another example of game behaviors, Slam Dunk King in this case.

In some embodiments, users can select from various pre-programmed games, and/or their favorite games such as Tic-Tac-Toe, Angry Birds, Basketball, Soccer, Fruit Ninja as shown in FIG. 11 and Slam Dunk King as shown in FIG. 12.

Jigsaw Pin

Figure 13:
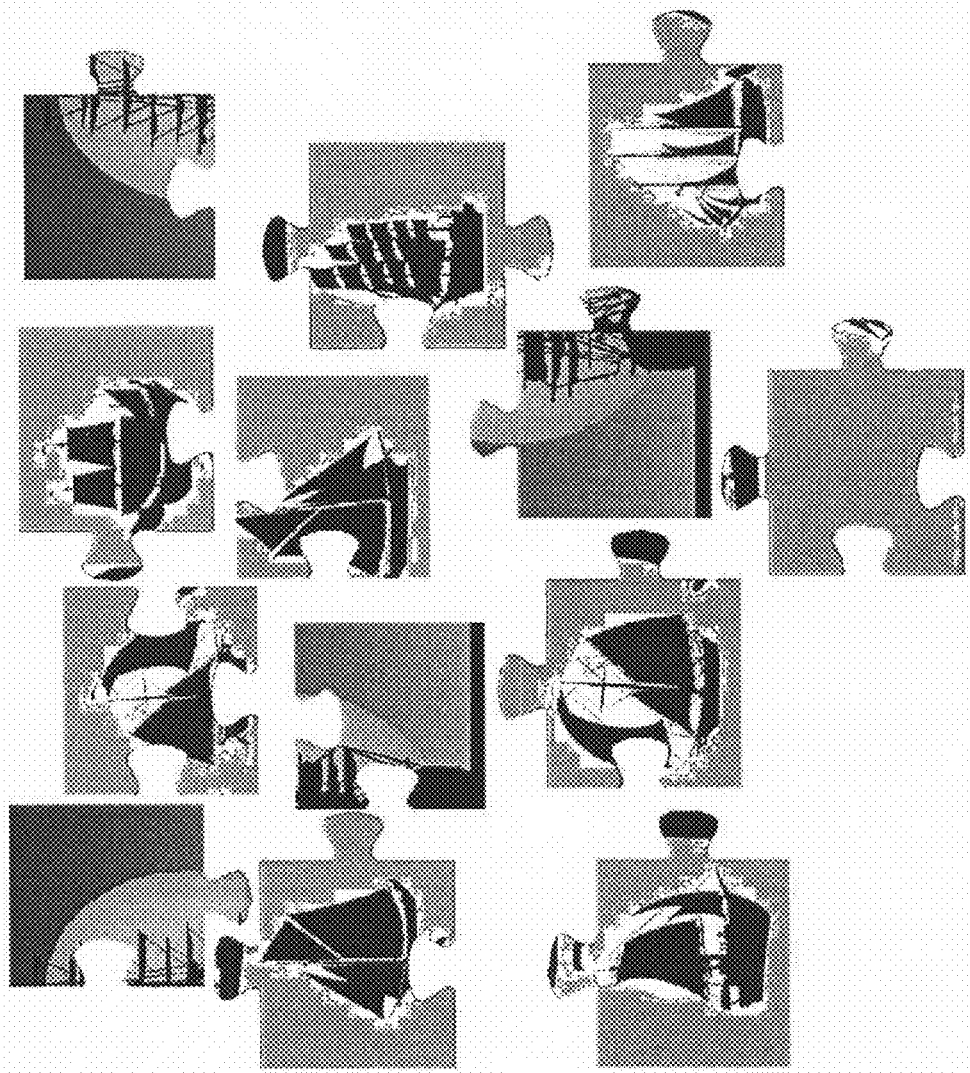
FIG. 13 illustrates a jigsaw or puzzle method wherein behavior is recognized by matching the shape of elements.

Like game behavior, another game-oriented hidden authentication method consists of one or more elements in the form of puzzle pieces as illustrated in FIG. 13. Under these embodiments, the movement and/or the selection and positioning of the elements may be recognized when a user selects and drags the pieces of the elements to relative to a final position and/or one another. Like other hidden authentication methods described heretofore, "jigsaw PINs", as referenced hereafter, recognize the behavior of putting the jigsaw puzzle together as at least one factor in the authentication. Likewise, a user has freedom to move the element in any direction or speed before placing the element in a final position.

Zoom Pin

Figure 14:
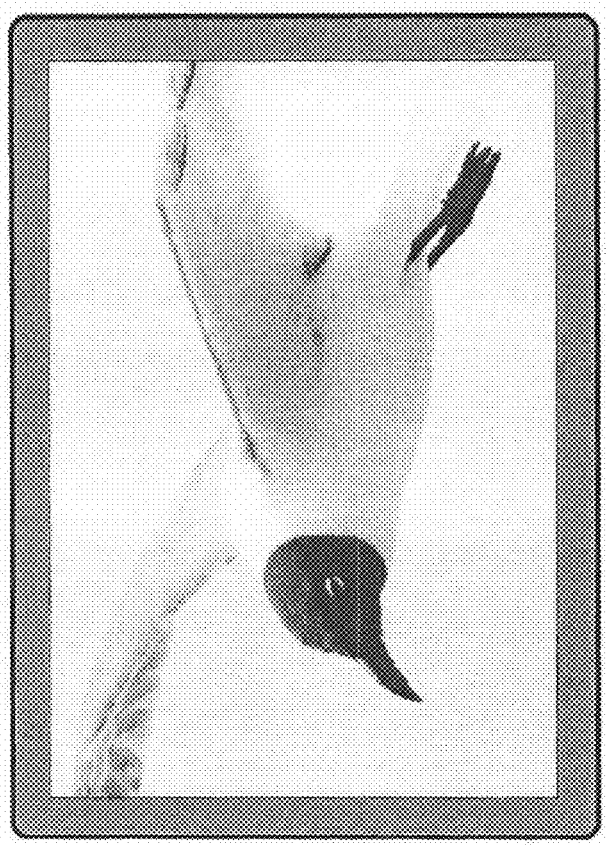
FIG. 14 describes a zoom method of authentication wherein each element zooms in to another image containing multiple elements such that each only one of the elements from the authentication set is visible at a time.
Figure 14:
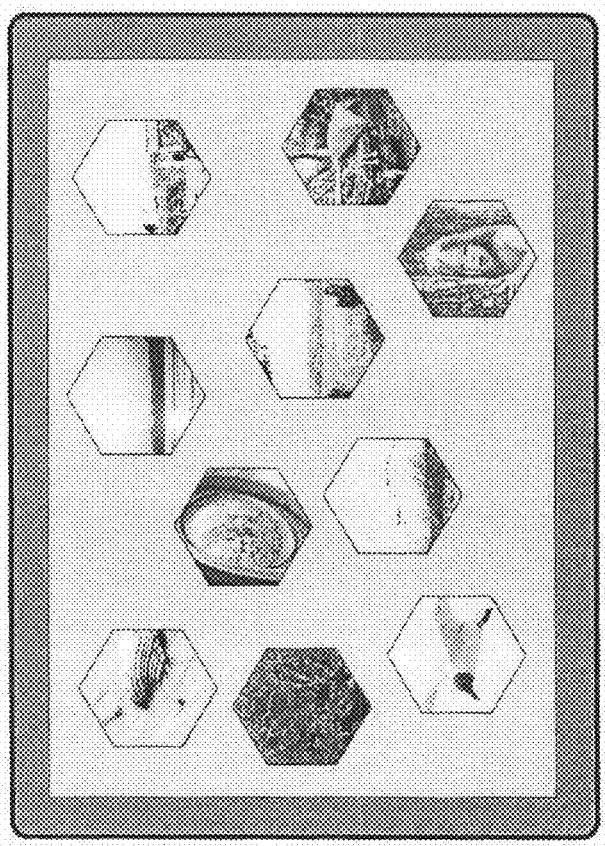

A zooming feature is used in one method of the present invention wherein a user may select an element from one or more other elements as illustrated in FIG. 14. If the correct element is chosen, then the image may magnify, as in some non-limiting embodiments, revealing one or more new images. The user may then select the correct portion of the correct image, causing the image to magnify again, and so on. This process may be extended until the user is authenticated. If the user correctly selects all of the correct portions of each image, then the user is authenticated.

In some non-limiting embodiments, the user may select each portion of an image by tapping, while in other embodiments the user may select a given portion of the image by using a given behavior. In other embodiments, the user may utilize a given behavior to drag one portion or element to another portion or element. As with previous methods, the behavior of how the PIN is "drawn" may contribute to the authentication of the user by recognizing factors such as the pattern, direction, speed, dwell time, area and/or pressure of the sensed behavior as non-limiting examples.

Invisible Pin

As in one method of the present invention, users are able to hide behaviors either partially or completely. Such embodiments include but are not limited to drawing a pattern.

Figure 15:
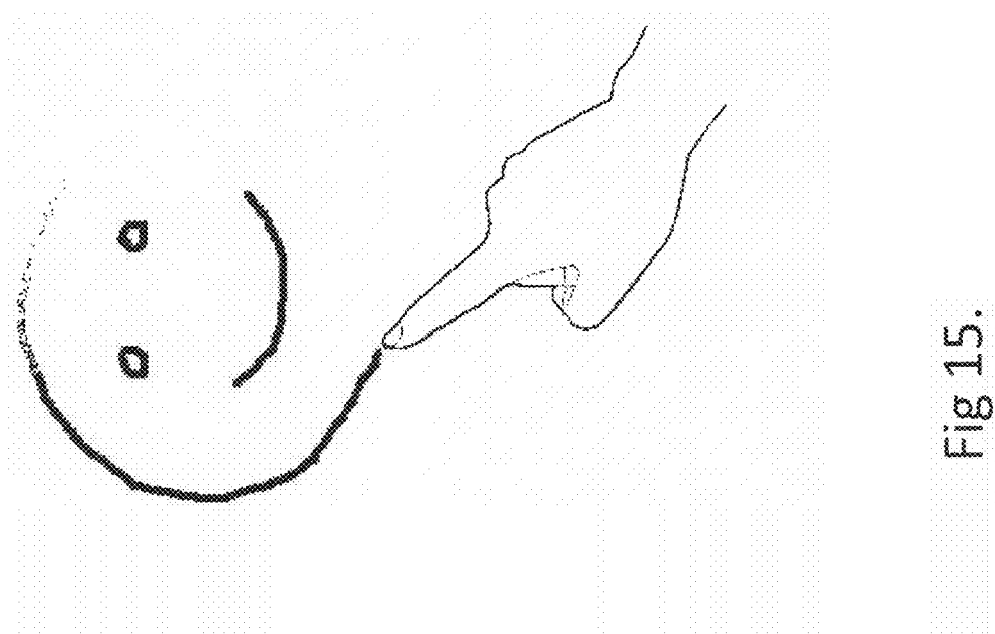
FIG. 15 describes an invisible authentication method, wherein the behavior may not be displayed or may be partially displayed as it is drawn FIG. 16 describes motion of a device in conjunction with a tapping behavior.

Patterns could include but are not limited to smiley face, letters, characters, initials, and/or just random patterns like objects or pictures. As with other hidden authentication methods described heretofore, the behavior consists of at least one factor for authentication. This "invisible PIN" method, referenced as such hereafter, may be completely invisible (e.g. no pattern displayed as a user performs the behavior or draws), or may be completely or partially visible, wherein the intensity decays or fades as the drawing or movement is performed as shown in FIG. 15.

Blink Pin

Facial expressions including but not limited to blinking may be utilized as a PIN in one method of the present invention. In some non-limiting method, one or more factors of behavior are derived from the facial expression. In the non-limiting example of blinking, one or more factors including but not limited to the number, interval, direction, speed, and/or sequence of blinks may be utilized to authenticate a user. Some embodiments consist of a method wherein one or more facial expressions may be used to authenticate a user. A user may move his lips three times and blink twice as a non-limiting example.

Motion Pins

In some embodiments, motion or movement of a device is performed prior, during or after another authentication method is performed. Non-limiting examples of authentication methods are augmented by motion or position of a device include "Position PINs", where a device is held in a specific position or orientation while a PIN is entered. In this embodiment, the position or orientation may be the behavior that is recognized as the PIN is entered.

Under some embodiments, the PIN could be replaced by another authentication method such as but not limited to a biometric such as a fingerprint, face, IRIS, voice, palm, heartbeat or the like. Likewise, the position of the device could be changed prior, during or after an entry of another authentication method.

For a non-limiting example, a face may be held in different positions such as but not limited to moving the face to the right for a period of time, then to up for another period of time, and finally to the left for some period of time. The face may be recognized as a biometric (something you are), but also the position and/or movement may be recognized as a behavior-metric (how the face is moved or for how long it is held in a specific position), as non-limiting examples.

Likewise, other authentication methods could replace a PIN as described herein including but not limited to electronic-metrics. Electronic-metrics describe "something you have" by some identifier that is sent from some electronic device. An identifier may be purposefully sent by a device, such as but not limited to some pattern or code transmitted, or in some embodiments, may characterize a device by emissions that are distinctive to that device. Like other authentication methods, electronic-metrics may be augmented and/or replaced by behavior-metrics that describe "how" the authentication if performed, not just what was selected or what is known, possessed, etc.

FIG. 16 illustrates three successive positions of a device 200 while the user taps on different touch-sensitive regions 202. In this embodiment both the touch manipulations and motion of the device 200 are used to authenticate the user.

An exemplary system for implementing the various software aspects of the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Non-transitory computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. A computing device may also have input device(s) such as a keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims

What is claimed is:

1. An apparatus for authenticating a user to gain access or entry to a secure system, device, application or location, the apparatus comprising:
   an input sensor responsive to a user's real-time behavioral input, the input sensor identifying real-time performance factors employed during input of the real-time behavioral input;
   a memory component for storing behavioral inputs and performance factors of authenticated users;
   a processing component for comparing the user's real-time behavioral input and a stored behavioral input and for comparing real-time performance factors and stored performance factors for determining a degree of match therebetween and for determining a risk score calculated based on the degree of match;
   the processing component for authenticating the user responsive to the risk score; and
   wherein the user's behavioral input comprises tapping or touching a plurality of display images or keys that each represent a numerical value, wherein a predetermined mathematical operation is executed as each numerical value is tapped or touched, thereby arriving at a final numerical value that is used for authenticating the user.

2. The apparatus of claim 1, wherein the real-time performance factors comprise one or more of: a length of time for the user to complete the user's behavioral input, a speed at which the user's behavioral input or portions of the user's behavioral input is entered, pressure applied or area encompassed during entry of the user's behavioral input, a region over which pressure is applied during entry of the user's behavioral input, user motions or motion direction during entry of the user's behavioral input, and a shape or pattern formed by the user's behavioral input, or one or more taps, swipes, movements, or hold periods associated with the user's behavioral input.

3. The apparatus of claim 1, further comprising at least one of a motion detector, a position detector, an accelerometer and a gyroscope for determining a position of the apparatus, the processing component additionally responsive to the position for authenticating the user.

4. The apparatus of claim 1, wherein the risk score is derived by additionally comparing the user's real-time performance factors and expected performance factors that are based on performance factors executed during a user's prior behavioral inputs.

5. The apparatus of claim 1 wherein the user's behavioral input is hidden from view of the user or not displayed on a display screen.

6. The apparatus of claim 1, wherein the mathematical operation comprises a predetermined algorithm, the algorithm for calculating the final numerical value for comparing with a stored numerical value to authenticate the user.

7. The apparatus of claim 1, further comprising a biometric sensor responsive to a biometric input of the user, the processing component for authenticating the user responsive to the risk score and further in response to the biometric input.

8. The apparatus of claim 1, wherein the processing component segregates the user's real time behavioral input into a plurality of time-based input segments each input to the apparatus during a different time interval, and determines characteristics of at least one of the plurality of segments, the processing component determining whether determined characteristics are present in a segment of a stored user behavioral input, presence in the stored user behavioral input for use by the processing component in authenticating the user.

9. The apparatus of claim 1, wherein the input sensor comprises a keypad, a touch screen, an image sensor, a microphone, one or more manually operated buttons or a touch-sensitive device.

10. The apparatus of claim 1, wherein the user's behavioral input comprises a plurality of input segments, the user authenticated if the processing device determines a match between a predetermined number of user behavioral input segments and stored behavioral segments.

11. The apparatus of claim 10 wherein a risk score is assigned to each one of the plurality of input segments and a combined risk score for all of the plurality of input segments is determined, if the combined risk score exceeds a predetermined combined risk score the user is authenticated.

12. The apparatus of claim 1, further comprising a display screen, wherein the user's behavioral input is entered on the display screen and subsequently erased from the display screen or changed in appearance.

13. An apparatus for authenticating a user to gain access or entry to a secure system, device, application or location, the apparatus comprising:
   an input sensor responsive to a user's real-time behavioral input, the snout sensor identifying real-time performance factors employed during input of the real-time behavioral input;
   a memory component for storing behavioral inputs and performance factors of authenticated users;
   a processing component for comparing the user's real-time behavioral input and a stored behavioral input and for comparing real-time performance factors and stored performance factors for determining a degree of match therebetween and for determining a risk score calculated based on the degree of match;
   the processing component for authenticating the user responsive to the risk score; and
   wherein the user's behavioral input comprises one or more of: selecting and dragging a first element presented on a display screen and orienting the first element over a second element; generating a third element from matching a fourth and fifth elements; causing a sixth element to disappear after matching with a seventh element; and a time element associated with the behavioral input.

14. The apparatus of claim 13, wherein the real-time performance factors comprise one or more of: a length of time for the user to complete the user's behavioral input, a speed at which the user's behavioral input or portions of the user's behavioral input is entered, pressure applied or area encompassed during entry of the user's behavioral input, a region over which pressure is applied during entry of the user's behavioral input, user motions or motion direction during entry of the user's behavioral input, and a shape or pattern formed by the user's behavioral input, or one or more taps, swipes, movements, or hold periods associated with the user's behavioral input.

15. The apparatus of claim 13, further comprising at least one of a motion detector, a position detector, an accelerometer and a gyroscope for determining a position of the apparatus, the processing component additionally responsive to the position for authenticating the user.

16. The apparatus of claim 13, wherein the risk score is derived by additionally comparing the user's real-time performance factors and expected performance factors that are based on performance factors executed during a user's prior behavioral inputs.

17. The apparatus of claim 13 wherein the user's behavioral input is hidden from view of the user or not displayed on a display screen.

18. The apparatus of claim 13, further comprising a biometric sensor responsive to a biometric input of the user, the processing component for authenticating the user responsive to the risk score and further in response to the biometric input.

19. The apparatus of claim 13, wherein the processing component segregates the user's real time behavioral input into a plurality of time-based input segments each input to the apparatus during a different time interval, and determines characteristics of at least one of the plurality of segments, the processing component determining whether determined characteristics are present in a segment of a stored user behavioral input, presence in the stored user behavioral input for use by the processing component in authenticating the user.

20. The apparatus of claim 13, wherein the input sensor comprises a keypad, a touch screen, an image sensor, a microphone, one or more manually operated buttons or a touch-sensitive device.

21. The apparatus of claim 13, wherein the user's behavioral input comprises a plurality of input segments, the user authenticated if the processing device determines a match between a predetermined number of user behavioral input segments and stored behavioral segments.

22. The apparatus of claim 21 wherein a risk score is assigned to each one of the plurality of input segments and a combined risk score for all of the plurality of input segments is determined, if the combined risk score exceeds a predetermined combined risk score the user is authenticated.

23. The apparatus of claim 13, wherein the user's behavioral input is entered on the display screen and subsequently erased from the display screen or changed in appearance.

24. An apparatus for authenticating a user to gain access or entry to a secure system, device, application or location, the apparatus comprising:
   an input sensor responsive to a user's real-time behavioral input, the input sensor identifying real-time performance factors employed during input of the real-time behavioral input;
   a memory component for storing behavioral inputs and performance factors of authenticated users;
   a processing component for comparing the user's real-time behavioral input and a stored behavioral input and for comparing real-time performance factors and stored performance factors for determining a degree of match therebetween and for determining a risk score calculated based on the degree of match;
   the processing component for authenticating the user responsive to the risk score; and
   wherein a plurality of characters presented in rows, in columns, on pages, on tumblers, or in wheels, and the user presented with a plurality of rows, columns, pages, tumblers, or wheels on a display screen, the behavioral input comprising the user selecting the row, column, page, tumbler or wheel in which a character comprising the user's personal identifier is present.

25. The apparatus of claim 24, wherein the real-time performance factors comprise one or more of: a length of time for the user to complete the user's behavioral input, a speed at which the user's behavioral input or portions of the user's behavioral input is entered, pressure applied or area encompassed during entry of the user's behavioral input, a region over which pressure is applied during entry of the user's behavioral input, user motions or motion direction during entry of the user's behavioral input, and a shape or pattern formed by the user's behavioral input, or one or more taps, swipes, movements, or hold periods associated with the user's behavioral input.

26. The apparatus of claim 24, further comprising at least one of a motion detector, a position detector, an accelerometer and a gyroscope for determining a position of the apparatus, the processing component additionally responsive to the position for authenticating the user.

27. The apparatus of claim 24, wherein the risk score is derived by additionally comparing the user's real-time performance factors and expected performance factors that are based on performance factors executed during a user's prior behavioral inputs.

28. The apparatus of claim 24, further comprising a biometric sensor responsive to a biometric input of the user, the processing component for authenticating the user responsive to the risk score and further in response to the biometric input.

29. The apparatus of claim 24, wherein the processing component segregates the user's real time behavioral input into a plurality of time-based input segments each input to the apparatus during a different time interval, and determines characteristics of at least one of the plurality of segments, the processing component determining whether determined characteristics are present in a segment of a stored user behavioral input, presence in the stored user behavioral input for use by the processing component in authenticating the user.

30. The apparatus of claim 24, wherein the input sensor comprises a keypad, a touch screen, an image sensor, a microphone, one or more manually operated buttons or a touch-sensitive device.

31. The apparatus of claim 24, wherein the user's behavioral input comprises a plurality of input segments, the user authenticated if the processing device determines a match between a predetermined number of user behavioral input segments and stored behavioral segments.

32. The apparatus of claim 31, wherein a risk score is assigned to each one of the plurality of input segments and a combined risk score for all of the plurality of input segments is determined, if the combined risk score exceeds a predetermined combined risk score the user is authenticated.

\* \* \* \* \*